(12) United States Patent
Lim et al.

(10) Patent No.: US 11,537,235 B2
(45) Date of Patent: Dec. 27, 2022

(54) DISPLAY DEVICE INCLUDING DISPLAY DRIVING PART TO OUTPUT COMPENSATION SIGNAL TO DATA LINES

(71) Applicant: Samsung Display Co., Ltd., Yongin-si (KR)

(72) Inventors: Sanghyun Lim, Cheonan-si (KR); Hyun-Wook Cho, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 17/345,796

(22) Filed: Jun. 11, 2021

(65) Prior Publication Data

US 2022/0137743 A1    May 5, 2022

(30) Foreign Application Priority Data

Nov. 5, 2020 (KR) .......................... 10-2020-0147052

(51) Int. Cl.
*G06F 3/041* (2006.01)
*G09G 3/3266* (2016.01)
(Continued)

(52) U.S. Cl.
CPC .......... *G06F 3/0418* (2013.01); *G06F 3/0412* (2013.01); *G06F 3/04162* (2019.05);
(Continued)

(58) Field of Classification Search
CPC ............... G06F 3/0418; G06F 3/04166; G06F 3/04162; G06F 3/0412; G09G 3/3266; G09G 3/3275; G09G 3/2007; G09G 3/3225; G09G 2310/0213; G09G 2310/0297; G09G 2310/08
See application file for complete search history.

(56) References Cited

U.S. PATENT DOCUMENTS 8,040,326 B2    10/2011   Hotelling et al.
10,261,628 B2    4/2019   Kim et al.
(Continued)

FOREIGN PATENT DOCUMENTS

KR    10-2016-0120401 A    10/2016
KR    10-2018-0025774 A    3/2018
(Continued)

*Primary Examiner* — Lisa S Landis
(74) *Attorney, Agent, or Firm* — Lewis Roca Rothgerber Christie LLP

(57) ABSTRACT

A display device includes: a display layer; a sensor layer on the display layer; a sensor driving part to provide a transmission signal to the sensor layer; and a display driving part to drive the display layer. The display layer includes: a plurality of pixels; first scan lines electrically connected to a first group of pixels; second scan lines electrically connected to a second group of pixels; and data lines electrically connected to the plurality of pixels. The display driving part is to drive the first scan lines, the second scan lines, and the data lines, and to alternately provide a pixel data signal and a compensation signal to data lines corresponding to the first group of pixels and data lines corresponding to the second group of pixels, the compensation signal being a signal that is complementary to at least one of the pixel data signal or the transmission signal.

19 Claims, 25 Drawing Sheets

(51) Int. Cl.
*G09G 3/3275* (2016.01)
*G09G 3/3225* (2016.01)
*G09G 3/20* (2006.01)

(52) U.S. Cl.
CPC ....... *G06F 3/04166* (2019.05); *G09G 3/3266* (2013.01); *G09G 3/3275* (2013.01); *G09G 3/2007* (2013.01); *G09G 3/3225* (2013.01); *G09G 2310/0213* (2013.01); *G09G 2310/0297* (2013.01); *G09G 2310/08* (2013.01); *G09G 2320/02* (2013.01)

(56) References Cited

U.S. PATENT DOCUMENTS

| | | |
|---|---|---|
| 2015/0062080 A1 | 3/2015 | Kang |
| 2016/0299597 A1 | 10/2016 | Yoo et al. |
| 2019/0102017 A1* | 4/2019 | Kim ................ G06F 3/0412 |
| 2020/0393926 A1* | 12/2020 | Kim ................ G06F 3/0445 |

FOREIGN PATENT DOCUMENTS

| | | |
|---|---|---|
| KR | 10-2087370 B1 | 3/2020 |
| KR | 10-2020-0028274 A | 9/2020 |

* cited by examiner

FIG. 3A
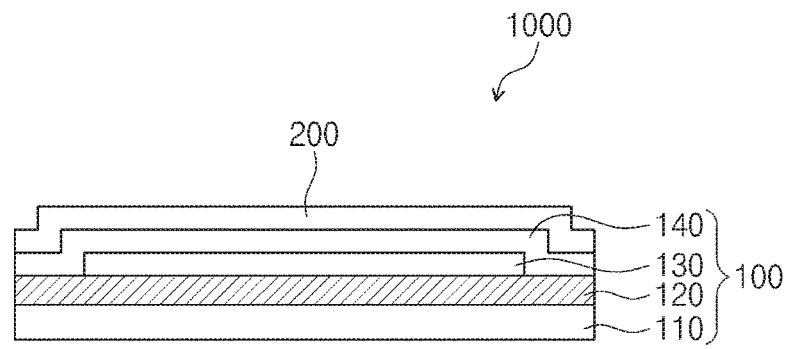
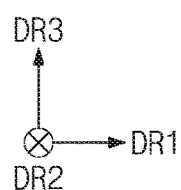
FIG. 3B
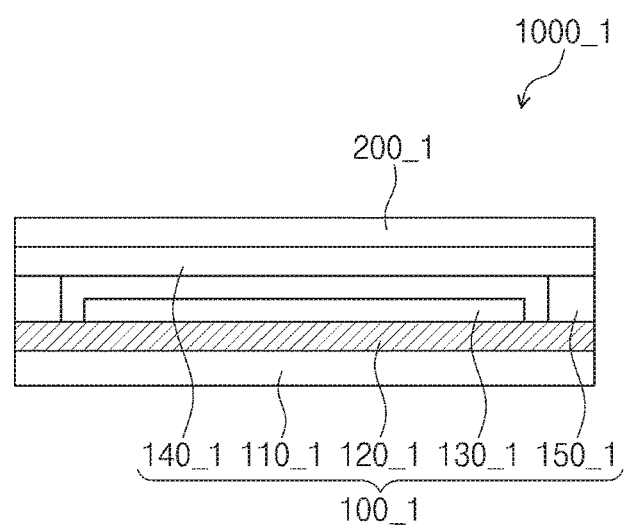
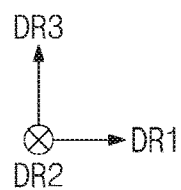

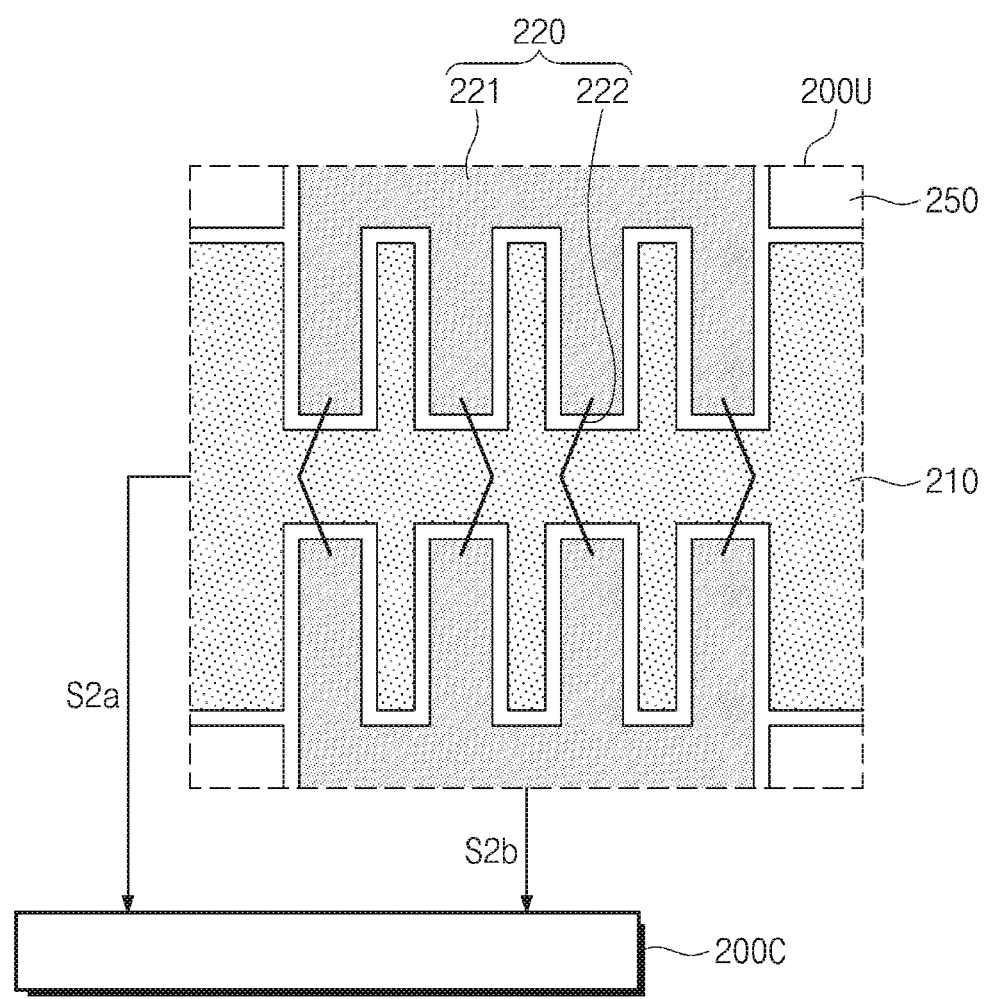

DISPLAY DEVICE INCLUDING DISPLAY DRIVING PART TO OUTPUT COMPENSATION SIGNAL TO DATA LINES

CROSS-REFERENCE TO RELATED APPLICATION

This application claims priority to and the benefit of Korean Patent Application No. 10-2020-0147052, filed on Nov. 5, 2020, the entire content of which is incorporated by reference herein.

BACKGROUND

Aspects of one or more embodiments of present disclosure relate to a display device that senses an input by an input device.

Multimedia display devices, for example, such as televisions, mobile phones, tablets, computers, navigation system parts, and game consoles, are equipped with a display device for displaying images. The display devices may include a display device that may provide a touch-based input method, which allows a user to easily input information or commands intuitively and conveniently, in addition to other input methods, for example, such as a button, a keyboard, and a mouse.

An input sensor may sense a touch or pressure by a user's body part. Meanwhile, the demand for using an electronic pen for a fine touch input to input information using a writing instrument or a specific application program (for example, such as an application program for sketches or drawings) is increasing.

The above information disclosed in this Background section is for enhancement of understanding of the background of the present disclosure, and therefore, it may contain information that does not constitute prior art.

SUMMARY

One or more embodiments of the present disclosure are directed to a display device capable of sensing an input by an input device, for example, such as an electronic pen.

According to one or more embodiments of the present disclosure, a display device includes: a display layer; a sensor layer on the display layer; a sensor driving part configured to provide a transmission signal to the sensor layer; and a display driving part configured to drive the display layer. The display layer includes: a plurality of pixels; first scan lines electrically connected to a first group of pixels from among the plurality of pixels; second scan lines electrically connected to a second group of pixels from among the plurality of pixels; and data lines electrically connected to the plurality of pixels. The display driving part is configured to drive the first scan lines, the second scan lines, and the data lines, and to alternately provide a pixel data signal and a compensation signal to data lines corresponding to the first group of pixels from among the data lines and data lines corresponding to the second group of pixels from among the data lines. The compensation signal is a signal that is complementary to at least one of the pixel data signal or the transmission signal.

In an embodiment, the plurality of pixels may be located along a first direction, and a second direction crossing the first direction; each of the first and second scan lines may extend in the first direction; and the data lines may extend in the second direction.

In an embodiment, pixels of the first group of pixels and pixels of the second group of pixels may be alternately located along the first direction.

In an embodiment, the compensation signal provided to a data line corresponding to a pixel from among the first group of pixels may have a voltage level that is complementary to the pixel data signal provided to a data line corresponding to a pixel from among the second group of pixels; and the compensation signal provided to a data line corresponding to a pixel from among the second group of pixels may have a voltage level that is complementary to the pixel data signal provided to a data line corresponding to a pixel from among the first group of pixels.

In an embodiment, during a first frame, the display driving part may be configured to provide the pixel data signal to the data lines corresponding to the first group of pixels, and to provide the compensation signal to the data lines corresponding to the second group of pixels; and during an adjacent second frame after the first frame, the display driving part may be configured to provide the pixel data signal to the data lines corresponding to the second group of pixels, and to provide the compensation signal to the data lines corresponding to the first group of pixels.

In an embodiment, the display driving part may be configured to sequentially drive the second scan lines to have an active level during the first frame, and to sequentially drive the first scan lines to have the active level during the second frame.

In an embodiment, the display layer may include a plurality of multiplexers corresponding to the data lines, respectively; and each of the multiplexers may be configured to provide any one of the pixel data signal or a signal that is complementary to the transmission signal to a corresponding data line in response to a selection signal.

In an embodiment, the display driving part may include: a scan driving circuit configured to drive the first scan lines and the second scan lines; and a data driving circuit configured to drive the data lines.

In an embodiment, the data driving circuit may be configured to receive the transmission signal, and to output a selection signal, the pixel data signal, and the compensation signal, the compensation signal may be a signal that is complementary to a sum of the pixel data signal and the transmission signal, the display layer may include a plurality of multiplexers corresponding to the data lines, respectively, and each of the multiplexers may be configured to provide any one of the pixel data signal or the compensation signal to a corresponding data line in response to the selection signal.

In an embodiment, the data driving circuit may be configured to receive the transmission signal, and to output a selection signal, the pixel data signal, and the compensation signal, the compensation signal may be a signal that is complementary to a sum of an average of pixel data signals in one frame and the transmission signal, the display layer may include multiplexers corresponding to the data lines, respectively, and each of the multiplexers may be configured to provide any one of the pixel data signal or the compensation signal to a corresponding data line in response to the selection signal.

In an embodiment, the sensor driving part may be configured to operate in a first mode for sensing an input by an input device that outputs a down-link signal, or in a second mode for sensing an input by a touch.

In an embodiment, in the first mode, the sensor driving part may be configured to output an up-link signal to the sensor layer, and to receive the down-link signal through the sensor layer; and the sensor driving part may be configured to generate the transmission signal according to the up-link signal.

In an embodiment, the display driving part may include: a first scan driving circuit configured to drive the first scan lines; a second scan driving circuit configured to drive the second scan lines; and a data driving circuit configured to drive the data lines.

In an embodiment, the first scan driving circuit may be configured to sequentially drive the first scan lines during a first frame; and the second scan driving circuit may be configured to sequentially drive the second scan lines during an adjacent second frame after the first frame.

In an embodiment, during the first frame, the data driving circuit may be configured to provide the pixel data signal to the data lines corresponding to the first group of pixels, and to provide the compensation signal to the data lines corresponding to the second group of pixels; and during the second frame, the data driving circuit may be configured to provide the pixel data signal to the data lines corresponding to the second group of pixels, and to provide the compensation signal to the data lines corresponding to the first group of pixels.

According to one or more embodiments of the present disclosure, a display device includes: a display layer; a sensor layer on the display layer; a sensor driving part configured to provide a transmission signal to the sensor layer; and a display driving part configured to drive the display layer. The display layer includes: a plurality of pixels; scan lines electrically connected to the pixels; data lines electrically connected to the pixels; and dummy data lines. Each of the dummy data lines is located adjacent to a corresponding data line from among the data lines, the display driving part is configured to output a data signal corresponding to a pixel data signal to the data lines, and to output a compensation signal to the dummy data lines, and the compensation signal is a signal that is complementary to at least one of the pixel data signal or the transmission signal.

In an embodiment, the dummy data lines may be insulated from the data lines and the pixels.

In an embodiment, a first dummy data line from among the dummy data lines may correspond to a first data line from among the data lines; and the compensation signal provided to the first dummy data line may be complementary to a data signal provided to the first data line.

In an embodiment, the compensation signal may be a signal that is complementary to an average of data signals provided to the data lines.

In an embodiment, the sensor driving part may be configured to output an up-link signal to the sensor layer, and to receive a down-link signal from an input device through the sensor layer; and the sensor driving part may be configured to generate the transmission signal according to the up-link signal.

BRIEF DESCRIPTION OF THE FIGURES

The above and other aspects and features of the present disclosure will be more clearly understood from the following detailed description of the illustrative, non-limiting example embodiments with reference to the accompanying drawings, in which:

FIG. 3A is a cross-sectional view of a display device according to an embodiment of the present disclosure;

FIG. 3B is a cross-sectional view of a display device according to an embodiment of the present disclosure;

FIGS. 7A-7C are views illustrating various operation modes of a sensor layer according to an embodiment of the present disclosure;

DETAILED DESCRIPTION

Figure 1:
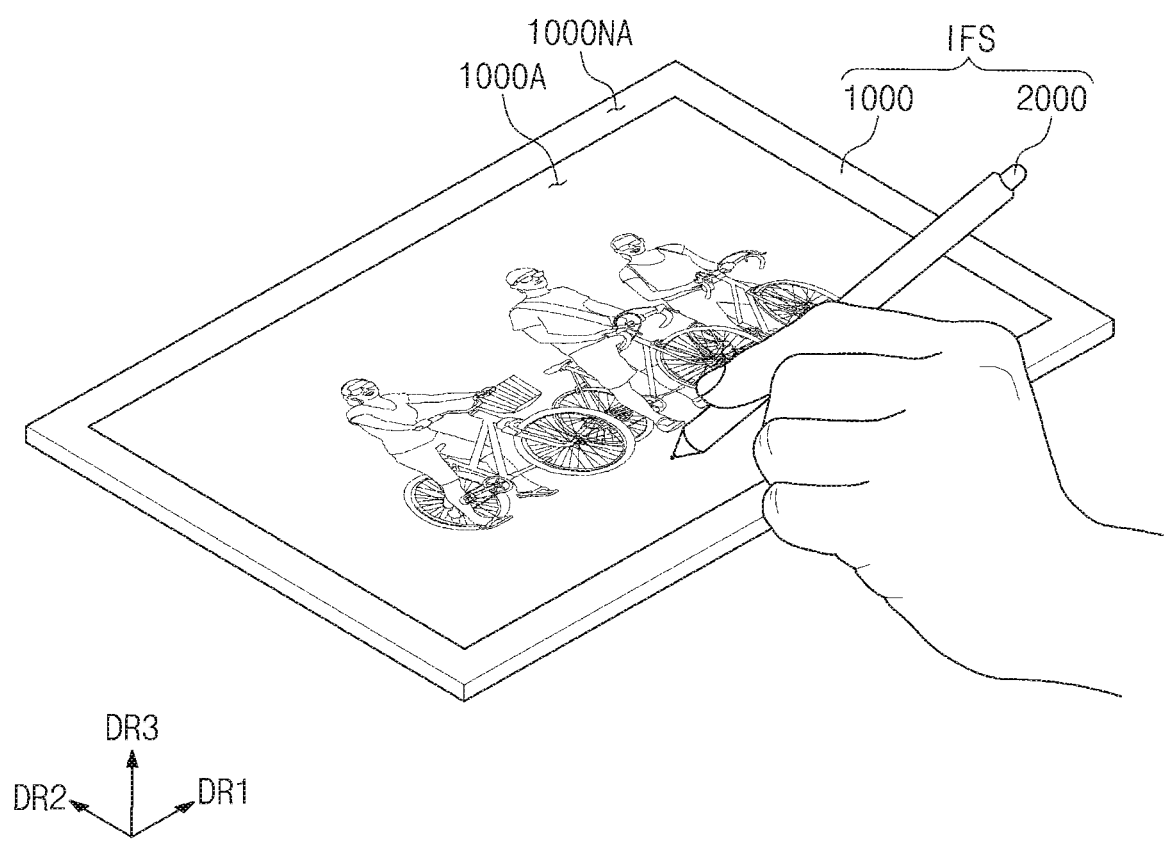
FIG. 1 is a perspective view of an interface device according to an embodiment of the present disclosure.

Hereinafter, embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, descriptions thereof may not be repeated.

When a certain embodiment may be implemented differently, a specific process order may be different from the described order. For example, two consecutively described processes may be performed at the same or substantially at the same time, or may be performed in an order opposite to the described order.

In the drawings, the relative sizes of elements, layers, and regions may be exaggerated and/or simplified for clarity. Spatially relative terms, such as "beneath," "below," "lower," "under," "above," "upper," and the like, may be used herein for ease of explanation to describe one element or feature's relationship to another element(s) or feature(s) with reference to the directions illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

In the figures, the first direction DR1, the second direction DR2, and the third direction DR3 are not limited to three axes of the rectangular coordinate system, and may be interpreted in a broader sense. For example, the first direction DR1, the second direction DR2, and the third direction DR3 may be perpendicular to or substantially perpendicular to one another, or may represent different directions from each other that are not perpendicular to one another.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "on," "connected to," or "coupled to" another element or layer, it can be directly on, connected to, or coupled to the other element or layer, or one or more intervening elements or layers may be present. Similarly, when a layer, an area, or an element is referred to as being "electrically connected" to another layer, area, or element, it may be directly electrically connected to the other layer, area, or element, and/or may be indirectly electrically connected with one or more intervening layers, areas, or elements therebetween. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the present disclosure. As used herein, the singular forms "a" and "an" are intended to include the plural forms as well, unless the context clearly indicates otherwise. It will be further understood that the terms "comprises," "comprising," "includes," "including," "has," "have," and "having," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, the expression "A and/or B" denotes A, B, or A and B. Expressions such as "at least one of," when preceding a list of elements, modify the entire list of elements and do not modify the individual elements of the list. For example, the expression "at least one of a, b, or c" indicates only a, only b, only c, both a and b, both a and c, both b and c, all of a, b, and c, or variations thereof.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively. Also, the term "exemplary" is intended to refer to an example or illustration.

As used herein, the term "part" may refer to a software component or a hardware component that performs a particular function. The hardware component may include, for example, a field-programmable gate array (FPGA) or an application-specific integrated circuit (ASIC). The software component may refer to an executable code and/or data used by an executable code in an addressable storage medium. Therefore, software components may be, for example, object-oriented software components, class components, and work components, and may include processes, functions, attributes, procedures, subroutines, program code segments, drivers, firmware, micro codes, circuits, data, databases, data structures, tables, arrangements, and/or variables.

The electronic or electric devices and/or any other relevant devices or components (e.g., the display driving part, the sensor driving part, the main driving part, and the like) according to embodiments of the present disclosure described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the embodiments of the present disclosure.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

FIG. 1 is a perspective view of an interface device according to an embodiment of the present disclosure.

Referring to FIG. 1, an interface device IFS may include a display device 1000 and an input device 2000. The display device 1000 may sense an input by the input device 2000. In the present disclosure, the display device 1000 and the input device 2000 may be referred to as the interface device IFS. The interface device IFS may also be referred to as a digitizer.

The display device 1000 may be a device that is activated by an electrical signal. For example, the display device 1000 may be any suitable electronic device including a display device, for example, such as a mobile phone, a foldable mobile phone, a rollable mobile phone, a tablet computer, a car navigation system, a game console, a wearable device, and/or the like, but the present disclosure is not limited thereto. In FIG. 1, for convenience of illustration, the display device 1000 is illustrated as a tablet computer as an example.

In the display device 1000, an active region 1000A and a peripheral region 1000NA may be defined. The display device 1000 may display an image through the active region 1000A. The active region 1000A may include a surface (e.g., a plane) defined by a first direction DR1 and a second direction DR2. The peripheral region 1000NA may surround (e.g., around a periphery of) the active region 1000A.

The thickness direction of the display device 1000 may be parallel to or substantially parallel to a third direction DR3, which crosses the first direction DR1 and the second direction DR2. In other words, the thickness direction of the display device 1000 may be defined by the third direction DR3. Therefore, the front surface (or the upper surface) and the rear surface (or the lower surface) of various members constituting (e.g., forming or included in) the display device 1000 may be defined on the basis of the third direction DR3.

Figure 2:
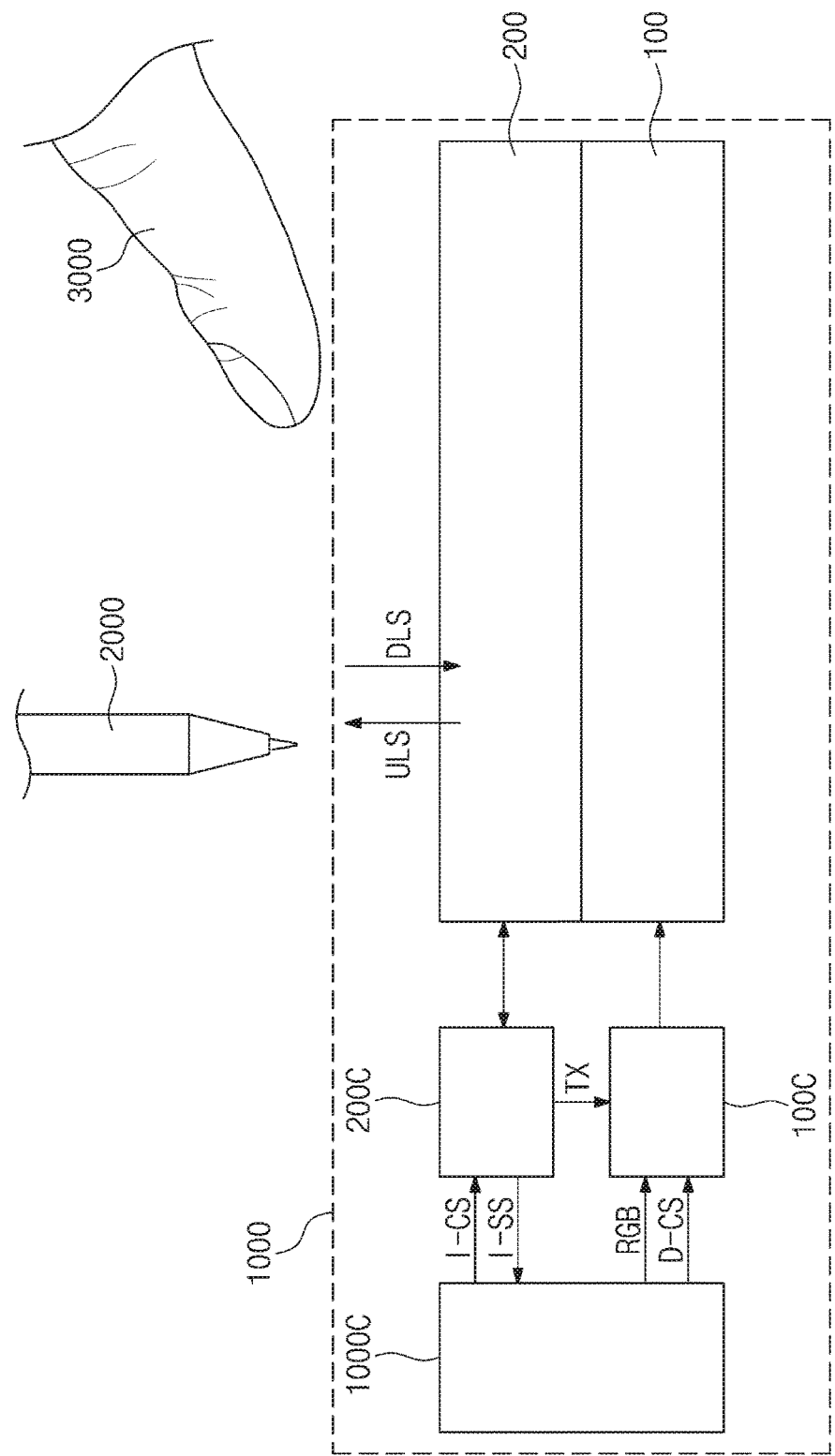
FIG. 2 is a view illustrating an operation between a display device and an input device according to an embodiment of the present disclosure.

FIG. 2 is a view illustrating an operation between a display device and an input device according to an embodiment of the present disclosure.

Referring to FIG. 2, the display device 1000 may sense an input (e.g., a touch event) provided from the outside. For example, the display device 1000 may sense both a first input by the input device 2000, and a second input by a touch (e.g., from a finger) 3000. The input device 2000 may be an electronic pen, which provides a driving signal. In the example illustrated in FIG. 2, the input device 2000 may be an active pen of an active type. The touch 3000 may include various suitable (e.g., all) input means capable of changing a capacitance, for example, such as a user's body part (e.g., the finger), a pen of a passive type, and the like.

The display device 1000 and the input device 2000 may communicate with each other in a bidirectional manner. The display device 1000 may provide an up-link signal ULS to the input device 2000, and the input device 2000 may provide a down-link signal DLS to the display device 1000. For example, the up-link signal ULS may include various suitable information, for example, such as panel information, a protocol version, and/or the like, but the present disclosure is not particularly limited thereto. The down-link signal DLS may include a synchronization signal, information on a state of the input device 2000, and/or the like. For example, the down-link signal DLS may include coordinate information, battery information, and slope information of the input device 2000, and/or various suitable information stored in the input device 2000, but the present disclosure is not particularly limited thereto.

The display device 1000 may include a display layer 100, a sensor layer 200, a display driving part (e.g., a display driver or a display driving circuit) 100C, a sensor driving part (e.g., a sensor driver or a sensor driving circuit) 200C, and a main driving part (e.g., a main driver or a main driving circuit) 1000C.

The display layer 100 may be a component that generates or substantially generates an image. The display layer 100 may be a light-emitting kind of display layer. For example, the display layer 100 may be an organic light emitting display layer, a quantum-dot display layer, a micro-LED display layer, or a nano-LED display layer.

The sensor layer 200 may be disposed on the display layer 100. The sensor layer 200 may sense an external input applied from the outside. The sensor layer 200 may sense both the first input by the input device 2000, and the second input by the touch 3000.

The main driving part 1000C may control an overall operation of the display device 1000. For example, the main driving part 1000C may control the operation of the display driving part 100C and the sensor driving part 200C. The main driving part 1000C may include at least one microprocessor, and the main driving part 1000C may be referred to as a host. The main driving part 1000C may further include a graphics controller.

The display driving part 100C may drive the display layer 100. The display driving part 100C may receive image data RGB and a driving control signal D-CS from the main driving part 1000C. The driving control signal D-CS may include various signals. For example, the driving control signal D-CS may include a vertical synchronization signal, a horizontal synchronization signal, a main clock signal, a data enable signal, and the like. The display driving part 100C may generate signals to be provided to the display layer 100 based on the driving control signal D-CS.

The sensor driving part 200C may drive the sensor layer 200. The sensor driving part 200C may receive a sensor control signal I-CS from the main driving part 1000C. The sensor control signal I-CS may include a mode determination signal for determining a driving mode of the sensor driving part 200C, and a clock signal. The sensor driving part 200C may operate in a first mode for sensing the first input by the input device 2000, or in a second mode for sensing the second input by the touch 3000, based on the sensor control signal I-CS.

The sensor driving part 200C may calculate coordinate information of the first input and/or the second input based on a signal received from the sensor layer 200, and may provide a coordinate signal I-SS corresponding to the coordinate information to the main driving part 1000C. The main driving part 1000C may execute an operation corresponding to a user input based on the coordinate signal I-SS. For example, the main driving part 1000C may drive the display driving part 100C according to coordinate signal I-SS, such that a new application image may be displayed on the display layer 100.

FIG. 3A is a cross-sectional view of a display device according to an embodiment of the present disclosure.

Referring to FIG. 3A, the display layer 100 may include a base layer 110, a circuit layer 120, a light emitting element layer 130, and an encapsulation layer 140.

The base layer 110 may be a member that provides a base surface on which the circuit layer 120 is disposed. The base layer 110 may be a glass substrate, a metal substrate, or a polymer substrate. However, the present disclosure is not limited thereto, and the base layer 110 may be an inorganic layer, an organic layer, or a composite material layer.

The base layer 110 may have a multi-layered structure. For example, the base layer 110 may include a first synthetic resin layer, a silicon oxide (SiOx) layer disposed on the first synthetic resin layer, an amorphous silicon (a-Si) layer disposed on the silicon oxide layer, and a second synthetic resin layer disposed on the amorphous silicon layer. The silicon oxide layer and the amorphous silicon layer may be referred to as a base barrier layer.

Each of the first and second synthetic resin layers may include a polyimide-based resin. In addition, each of the first and second synthetic resin layers may include at least one of an acrylate-based resin, a methacrylate-based resin, a polyisoprene-based resin, a vinyl-based resin, an epoxy-based resin, a urethane-based resin, a cellulose-based resin, a siloxane-based resin, a polyamide-based resin, or a perylene-based resin. As used in the present disclosure, "~~"-based resin includes a functional group of "~~".

The circuit layer 120 may be disposed on the base layer 110. The circuit layer 120 may include an insulation layer, a semiconductor pattern, a conductive pattern, a signal line, and the like. The insulation layer, a semiconductor layer, and a conductive layer are formed on the base layer 110 by coating, deposition, and/or the like, and thereafter, the insulation layer, the semiconductor layer, and the conductive layer may be selectively patterned by performing a photolithography process a plurality of times. Thereafter, the semiconductor pattern, the conductive pattern, and the signal line, which are all included in the circuit layer 120, may be formed.

The light emitting element layer 130 may be disposed on the circuit layer 120. The light emitting element layer 130 may include a light emitting element. For example, the light emitting element layer 130 may include an organic light emitting material, a quantum dot, a quantum rod, a micro LED, or a nano LED.

The encapsulation layer 140 may be disposed on the light emitting element layer 130. The encapsulation layer 140 may protect the light emitting element layer 130 from foreign materials, for example, such as moisture, oxygen, and dust particles.

The sensor layer 200 may be disposed on the display layer 100. The sensor layer 200 may sense the external input applied from the outside. The external input may be a user input. The user input includes various suitable forms of external inputs, for example, such as a part (e.g., a finger) of a user's body, a pen, light, heat, pressure, and/or the like.

The sensor layer 200 may be formed on the display layer 100 through a series of processes. In this case, the sensor layer 200 may be expressed as being directly disposed on the display layer 100. Being directly disposed may mean that a third component is not disposed between the sensor layer 200 and the display layer 100. In other words, a separate adhesive member may not be disposed between the sensor layer 200 and the display layer 100.

As another example, the sensor layer 200 and the display layer 100 may be connected to (e.g., coupled to or attached to) each other by an adhesive member. The adhesive member may include a suitable adhesive or a pressure-sensitive adhesive.

In some embodiments, the display device 1000 may further include an anti-reflection layer and an optical layer disposed on the sensor layer 200. The anti-reflection layer may reduce a reflectance of external light that is incident from the outside of the display device 1000. The optical layer may improve the front surface luminance of the display device 1000 by controlling a direction of light incident from the display layer 100.

FIG. 3B is a cross-sectional view of a display device according to an embodiment of the present disclosure.

Referring to FIG. 3B, a display device 1000_1 may include a display layer 100_1 and a sensor layer 200_1. The display layer 100_1 may include a base substrate 110_1, a circuit layer 120_1, a light emitting element layer 130_1, an encapsulation substrate 140_1, and a coupling member 150_1. The base substrate 110_1, the circuit layer 120_1, and the light emitting layer 130_1 may be the same or substantially the same as those described above with reference to FIG. 3A, and thus, redundant description thereof may not be repeated.

Each of the base substrate 110_1 and the encapsulation substrate 140_1 may be a glass substrate, a metal substrate, a polymer substrate, or the like, but the present disclosure is not particularly limited thereto.

The coupling member 150_1 may be disposed between the base substrate 110_1 and the encapsulation substrate 140_1. The coupling member 150_1 may connect (e.g., couple or attach) the encapsulation substrate 140_1 to the base substrate 110_1 or to the circuit layer 120_1. The coupling member 150_1 may include an inorganic material or an organic material. For example, the inorganic material may include a frit seal, and the organic material may include a photo-curable resin or a photo-plastic resin. However, the material constituting the coupling member 150_1 is not limited to the above examples.

The sensor layer 200_1 may be directly disposed on the encapsulation substrate 140_1. Being directly disposed may mean that a third component is not disposed between the sensor layer 200_1 and the encapsulation substrate 140_1. In other words, a separate coupling member (e.g., a separate adhesive member) may not be disposed between the sensor layer 200_1 and the display layer 100_1. However, the present disclosure is not limited thereto. For example, in some embodiments, an adhesive layer may be further disposed between the sensor layer 200_1 and the encapsulation substrate 140_1.

Figure 4:
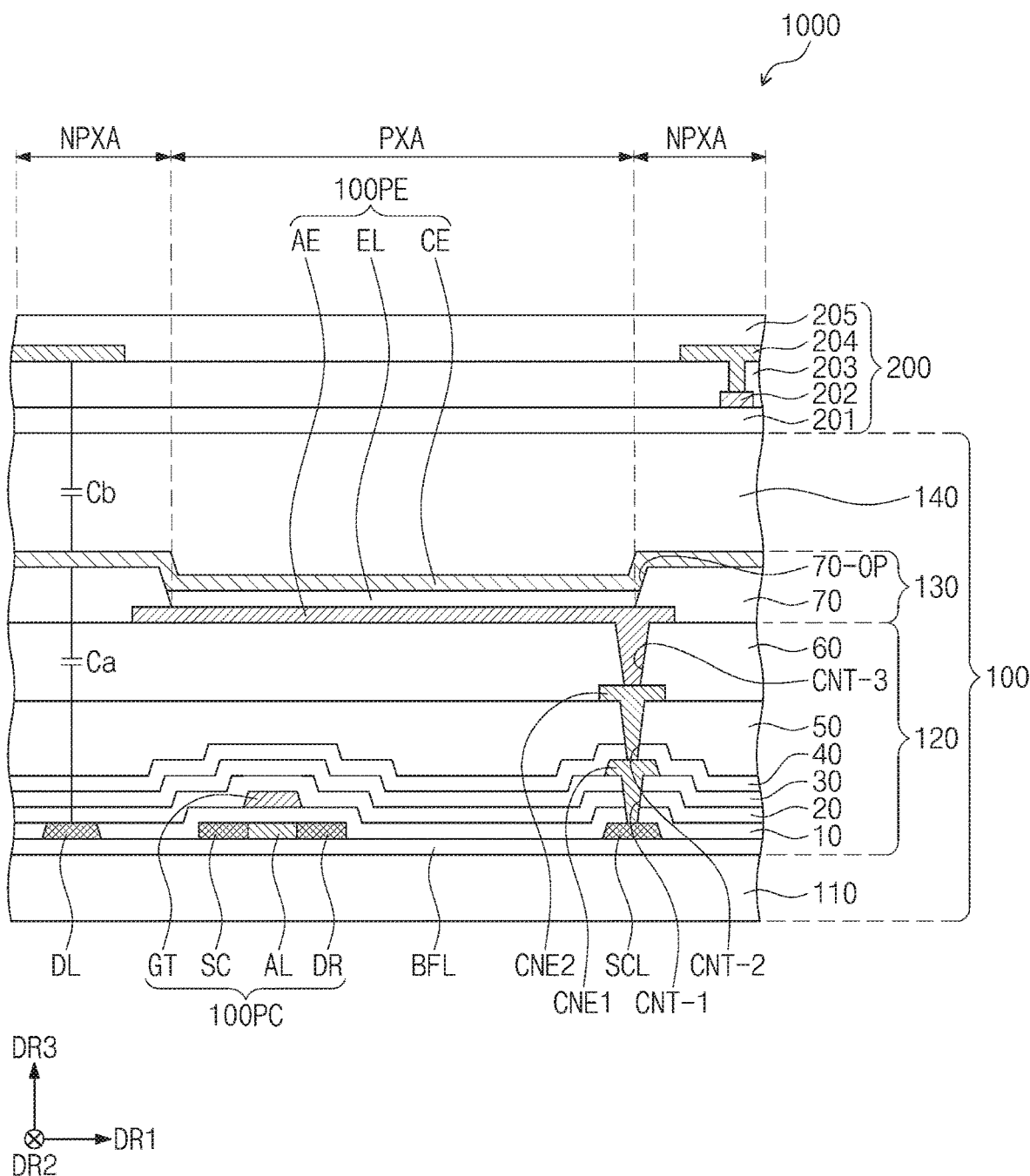
FIG. 4 is a cross-sectional view of a display device according to an embodiment of the present disclosure.

FIG. 4 is a cross-sectional view of a display device according to an embodiment of the present disclosure.

Referring to FIG. 4, at least one inorganic layer is formed on an upper surface of the base layer 110. The inorganic layer may include at least one of aluminum oxide, titanium oxide, silicon oxide, silicon nitride, silicon oxynitride, zirconium oxide, or hafnium oxide. The inorganic layer may be formed as a multi-layered inorganic layer. The multi-layered inorganic layers may constitute the barrier layer and/or the buffer layer. In the present embodiment, the display layer 100 is illustrated as including a buffer layer BFL.

The buffer layer BFL may improve a bonding force between the base layer 110 and the semiconductor pattern.

The buffer layer BFL may include at least one of silicon oxide, silicon nitride, or silicon oxynitride. For example, the buffer layer BFL may include a structure in which a silicon oxide layer and a silicon nitride layer are alternately stacked.

The semiconductor pattern may be disposed on the buffer layer BFL. The semiconductor pattern may include polysilicon. However, the present disclosure is not limited thereto. For example, the semiconductor pattern may include amorphous silicon, low-temperature polycrystalline silicon, or an oxide semiconductor.

FIG. 4 illustrates a portion of the semiconductor pattern, and the semiconductor pattern may be further disposed at (e.g., in or on) another region. The semiconductor pattern may be arranged according to a suitable rule (e.g., a predetermined or specific rule) across the pixels. The semiconductor pattern may have different electrical properties depending on whether or not the semiconductor pattern is doped. The semiconductor pattern may include a first region having a high conductivity rate, and a second region having a low conductivity rate. The first region may be doped with an N-type dopant or a P-type dopant. A P-type transistor may include a doped region which has been doped with the P-type dopant, and an N-type transistor may include a doped region which has been doped with the N-type dopant. The second region may be a non-doped region, or a region doped with a lower concentration than that of the first region.

The conductivity of the first region may be greater than the conductivity of the second region, and the first region may serve as or substantially serve as an electrode or a signal line. The second region may correspond to or substantially correspond to an active region (or a channel region) of a transistor. In other words, a portion of the semiconductor pattern may be an active (e.g., an active region) of the transistor, another portion thereof may be a source or a drain of the transistor, and another portion thereof may be a connection electrode or a connection signal line.

Figure 5:
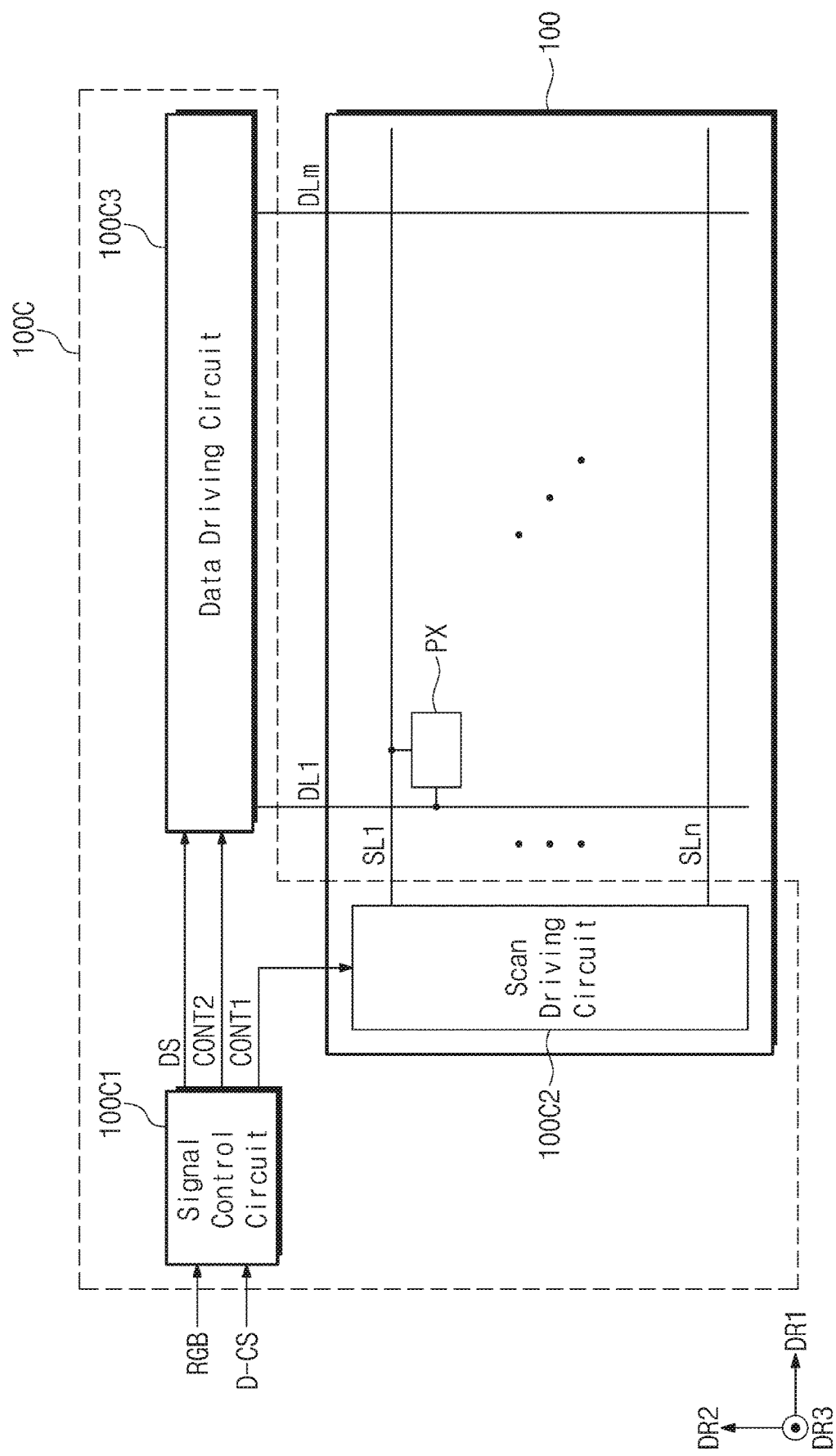
FIG. 5 is a block diagram of a display device and a display driving part according to an embodiment of the present disclosure.

The display layer 100 may include a plurality of pixels PX (e.g., refer to FIG. 5). Each of the pixels PX may include, for example, a plurality of transistors, one or more capacitors, and an organic light emitting element. FIG. 4 illustrates one transistor 100PC from among the plurality of transistors, and a light emitting element 100PE included in one pixel PX of the plurality of pixels PX.

A source SC, an active AL, and a drain DR of the transistor 100PC may be formed from the semiconductor pattern. The source SC and the drain DR may be extended in opposite directions from each other from the active AL on a cross sectional view. FIG. 4 illustrates a portion of a connection signal line SCL formed from the semiconductor pattern. Although not separately illustrated, the connection signal line SCL may be connected to the drain DR of the transistor 100PC in a plan view. In addition, FIG. 4 illustrates a portion of a data line DL formed from the semiconductor pattern. Although not separately illustrated, the data line DL may be connected to any suitable one of a drain or a source of another transistor (e.g., a switching transistor).

A first insulation layer 10 may be disposed on the buffer layer BFL. The first insulation layer 10 may commonly overlap with a plurality of pixels, and may cover the semiconductor pattern. The first insulation layer 10 may be an inorganic layer and/or an organic layer, and may have a single-layer structure or a multi-layered structure. The first insulation layer 10 may include at least one of aluminum oxide, titanium oxide, silicon oxide, silicon nitride, silicon oxynitride, zirconium oxide, or hafnium oxide. In the present embodiment, the first insulation layer 10 may be a silicon oxide layer of a single layer. In addition to the first insulation layer 10, an insulation layer of the circuit layer 120, which will be described in more detail below, may be an inorganic layer and/or an organic layer, and may have a single-layer structure or a multi-layered structure. The inorganic layer may include at least one of the above-described materials, but the present disclosure is not limited thereto.

A gate GT of the transistor 100PC is disposed on the first insulation layer 10. The gate GT may be a portion of a metal pattern. The gate GT overlaps with the active AL. In a process of doping the semiconductor pattern, the gate GT may function as a mask.

A second insulation layer 20 is disposed on the first insulation layer 10, and may cover the gate GT. The second insulation layer 20 may commonly overlap with the pixels. The second insulation layer 20 may be an inorganic layer and/or an organic layer, and may have a single-layer structure or a multi-layered structure. The second insulation layer 20 may include at least one of silicon oxide, silicon nitride, or silicon oxynitride. In the present embodiment, the second insulation layer 20 may have a multi-layered structure including a silicon oxide layer and a silicon nitride layer.

A third insulation layer 30 may be disposed on the second insulation layer 20. The third insulation layer 30 may have a single-layer structure or a multi-layered structure. For example, the third insulation layer 30 may have a multi-layered structure including a silicon oxide layer and a silicon nitride layer.

A first connection electrode CNE1 may be disposed on the third insulation layer 30. The first connection electrode CNE1 may be connected to the connection signal line SCL through a contact hole CNT-1 passing through (e.g., penetrating) the first to third insulation layers 10, 20, and 30.

A fourth insulation layer 40 may be disposed on the third insulation layer 30. The fourth insulation layer 40 may be a silicon oxide layer of a single layer. A fifth insulation layer 50 may be disposed on the fourth insulation layer 40. The fifth insulation layer 50 may be an organic layer.

A second connection electrode CNE2 may be disposed on the fifth insulation layer 50. The second connection electrode CNE2 may be connected to the first connection electrode CNE1 through a contact hole CNT-2 passing through (e.g., penetrating) the fourth insulation layer 40 and the fifth insulation layer 50.

A sixth insulation layer 60 is disposed on the fifth insulation layer 50, and may cover the second connection electrode CNE2. The sixth insulation layer 60 may be an organic layer.

The light emitting element layer 130 may be disposed on the circuit layer 120. The light emitting element layer 130 may include the light emitting element 100PE. For example, the light emitting element layer 130 may include an organic light emitting material, a quantum dot, a micro LED, or a nano LED. Hereinafter, for convenience, the light emitting element 100PE is described in more detail as being an organic light emitting element, but the present disclosure is not particularly limited thereto.

The light emitting element 100PE may include a first electrode AE, a light emitting layer EL, and a second electrode CE.

The first electrode AE may be disposed on the sixth insulation layer 60. The first electrode AE may be connected to the second connection electrode CNE2 through a contact hole CNT-3 passing through (e.g., penetrating) the sixth insulation layer 60.

A pixel definition film 70 is disposed on the sixth insulation layer 60, and may cover a portion of the first electrode AE. An opening 70-OP may be defined in the pixel definition film 70. The opening 70-OP of the pixel definition film 70 exposes at least a portion of the first electrode AE.

The active region 1000A (e.g., refer to FIG. 1) may include a light emitting area (e.g., a light emitting region) PXA, and a non-light emitting area (e.g., a non-light emitting region) NPXA adjacent to the light emitting area PXA. The non-light emitting region NPXA may surround (e.g., around a periphery of) the light emitting region PXA. In the present embodiment, the light emitting region PXA is defined to correspond to some regions of the first electrode AE exposed by the opening 70-OP.

The light emitting layer EL may be disposed on the first electrode AE. The light emitting layer EL may be disposed at (e.g., in or on) a region corresponding to the opening 70-OP. In other words, the light emitting layer EL may be divided, and formed for each of the pixels. When the light emitting layer EL is divided and formed for each of the pixels, each of the light emitting layers EL may emit light of at least one color from among blue, red, or green. However, the present disclosure is not limited thereto, and the light emitting layer EL may be connected to the pixels, and may be commonly provided. In this case, the light emitting layer EL may provide blue light or white light.

The second electrode CE may be disposed on the light emitting layer EL. The second electrode CE has an integral shape, and may be commonly disposed in the plurality of pixels.

In some embodiments, a hole control layer may be disposed between the first electrode AE and the light emitting layer EL. The hole control layer may be commonly disposed at (e.g., in or on) the light emitting region PXA and the non-light emitting region NPXA. The hole control layer includes a hole transport layer, and may further include a hole injection layer. An electron control layer may be disposed between the light emitting layer EL and the second electrode CE. The electron control layer includes an electron transport layer, and may further include an electron injection layer. The hole control layer and the electron control layer may be commonly formed in the plurality of pixels using an open mask.

The encapsulation layer 140 may be disposed on the light emitting element layer 130. The encapsulation layer 140 may include an inorganic layer, an organic layer, and an inorganic layer that are sequentially stacked, but the layers constituting the encapsulation layer 140 are not limited thereto.

The inorganic layers may protect the light emitting element layer 130 from moisture and oxygen, and the organic layer may protect the light emitting element layer 130 from foreign materials, for example, such as dust particles. The inorganic layers may include a silicon nitride layer, a silicon oxynitride layer, a silicon oxide layer, a titanium oxide layer, an aluminum oxide layer, or the like. The organic layer may include an acrylic organic layer, but the present disclosure is not limited thereto.

The sensor layer 200 may include a base layer 201, a first conductive layer 202, a sensing insulation layer 203, a second conductive layer 204, and a cover insulation layer 205.

The base layer 201 may be an inorganic layer including at least one of silicon nitride, silicon oxynitride, or silicon oxide. As another example, the base layer 201 may be an organic layer including an epoxy resin, an acrylic resin, or an imide-based resin. The base layer 201 may have a single-layer structure, or a multi-layered structure in which various layers are stacked along the third direction DR3.

Each of the first conductive layer 202 and the second conductive layer 204 may have a single-layer structure, or a multi-layered structure in which various layers are stacked along the third direction DR3.

A conductive layer of a single-layer structure may include a metal layer or a transparent conductive layer. The metal layer may include molybdenum, silver, titanium, copper, aluminum, or an alloy thereof. The transparent conductive layer may include a transparent conductive oxide, for example, such as indium tin oxide (ITO), indium zinc oxide (IZO), zinc oxide (ZnO), indium tin zinc oxide (ITZO), or the like. In addition, the transparent conductive layer may include a conductive polymer such as PEDOT, a metal nanowire, graphene, and/or the like.

A conductive layer of a multi-layered structure may include various suitable metal layers. The metal layers may have, for example, a three-layered structure of titanium/aluminum/titanium. The conductive layer of a multi-layered structure may include at least one metal layer and at least one transparent conductive layer.

At least one of the sensing insulation layer 203 and/or the cover insulation layer 205 may include an inorganic film. The inorganic film may include at least one of aluminum oxide, titanium oxide, silicon oxide, silicon nitride, silicon oxynitride, zirconium oxide, or hafnium oxide.

At least one of the sensing insulation layer 203 and/or the cover insulation layer 205 may include an organic film. The organic film may include at least one from among an acrylic resin, a methacryl-based resin, polyisoprene, a vinyl-based resin, an epoxy-based resin, a urethane-based resin, a cellulose-based resin, a siloxane-based resin, a polyimide-based resin, a polyamide-based resin, or a perylene-based resin.

Between the data line DL of the display layer 100 and the second electrode CE, a parasitic capacitance Ca may be formed. In addition, between the second conductive layer 204 of the sensor layer 200 and the second electrode CE, a parasitic capacitance Cb may be formed.

A data signal transmitted through the data line DL is a signal corresponding to the image data RGB, and a voltage level thereof changes according to a gray scale of an image to be displayed on the display layer 100. The change in the voltage level of the data signal transmitted through the data line DL may change the parasitic capacitance Ca between the data line DL and the second electrode CE, which may act as noise in the second conductive layer 204 through the parasitic capacitance Cb between the second conductive layer 204 and the second electrode CE. In this case, a signal transmitted through the second conductive layer 204 may be distorted, resulting in deterioration in the sensing sensitivity.

The signal transmitted through the second conductive layer 204 may be a signal corresponding to any one of the up-link signal ULS and/or the down-link signal DLS (e.g., refer to FIG. 2). Each of the up-link signal ULS and the down-link signal DLS may be a signal that periodically transitions to a first level (e.g., an active level) and a second level (e.g., an inactive level). As the signal level of the signal transmitted through the second conductive layer 204 periodically changes, the parasitic capacitance Cb between the second conductive layer 204 and the second electrode CE may be changed, which may act as noise in the data line DL through the parasitic capacitance Ca between the data line DL and the second electrode CE. In this case, the display quality of an image displayed on the display layer 100 may be deteriorated.

FIG. 5 is a block diagram of a display device and a display driving part according to an embodiment of the present disclosure.

Referring to FIG. 5, the display layer 100 may include a plurality of scan lines SL1 to SLn, a plurality of data lines DL1 to DLm, and the plurality of pixels PX, where n and m are each natural numbers greater than 1. Each of the plurality of pixels PX is connected to a corresponding data line from among the plurality of data lines DL1 to DLm, and a corresponding scan line from among the plurality of scan lines SL1 to SLn. In an embodiment of the present disclosure, the display layer 100 may further include light emission control lines. However, the present disclosure is not limited thereto, and the configuration of the display layer 100 is not particularly limited.

The display driving part 100C may include a signal control circuit 100C1, a scan driving circuit 100C2, and a data driving circuit 100C3. When the display layer 100 includes the light emission control lines, the display driving part 100C may further include a light emission driving circuit, which provides control signals to the light emission control lines.

The signal control circuit 100C1 may receive the image data RGB and the driving control signal D-CS from the main driving part 1000C (e.g., refer to FIG. 2). The driving control signal D-CS may include various suitable signals. In an embodiment, the driving control signal D-CS may include a vertical synchronization signal, a horizontal synchronization signal, a main clock, a data enable signal, and the like.

The signal control circuit 100C1 may generate a first control signal CONT1 on the basis of the driving control signal D-CS, and may output the first control signal CONT1 to the scan driving circuit 100C2. The signal control circuit 100C1 may generate a second control signal CONT2 on the basis of the driving control signal D-CS, and may output the second control signal CONT2 to the data driving circuit 100C3. In addition, the signal control circuit 100C1 may convert the image data RGB to an image data signal DS, and may output the image data signal DS to the data driving circuit 100C3.

The scan driving circuit 100C2 drives the scan lines SL1 to SLn in response to the first control signal CONT1. In an embodiment of the present disclosure, the scan driving circuit 100C2 may be formed through the same or substantially the same process as that of the circuit layer 120 (e.g., refer to FIG. 4) in the display layer 100, but the present disclosure is not limited thereto. In an embodiment, the scan driving circuit 100C2 may be implemented as an integrated circuit (IC), and may be mounted directly on a suitable region (e.g., a predetermined region) of the display layer 100, or may be mounted on a separate printed circuit board in a chip on film (COF) manner to be electrically connected to the display layer 100.

The data driving circuit 100C3 may output data signals for driving the plurality of the data lines DL1 to DLm in response to the second control signal CONT2 and the image data signal DS from the signal control circuit 100C1. The data driving circuit 100C3 may be implemented as an integrated circuit, and may be mounted directly on a suitable region (e.g., a predetermined region) of the display layer 100, or may be mounted on a separate printed circuit board in a chip on film manner to be electrically connected to the display layer 100. However, the present disclosure is not particularly limited. In an embodiment, the data driving circuit 100C3 may be formed through the same or substantially the same process as that of the circuit layer 120 (e.g., refer to FIG. 4) in the display layer 100.

Figure 6:
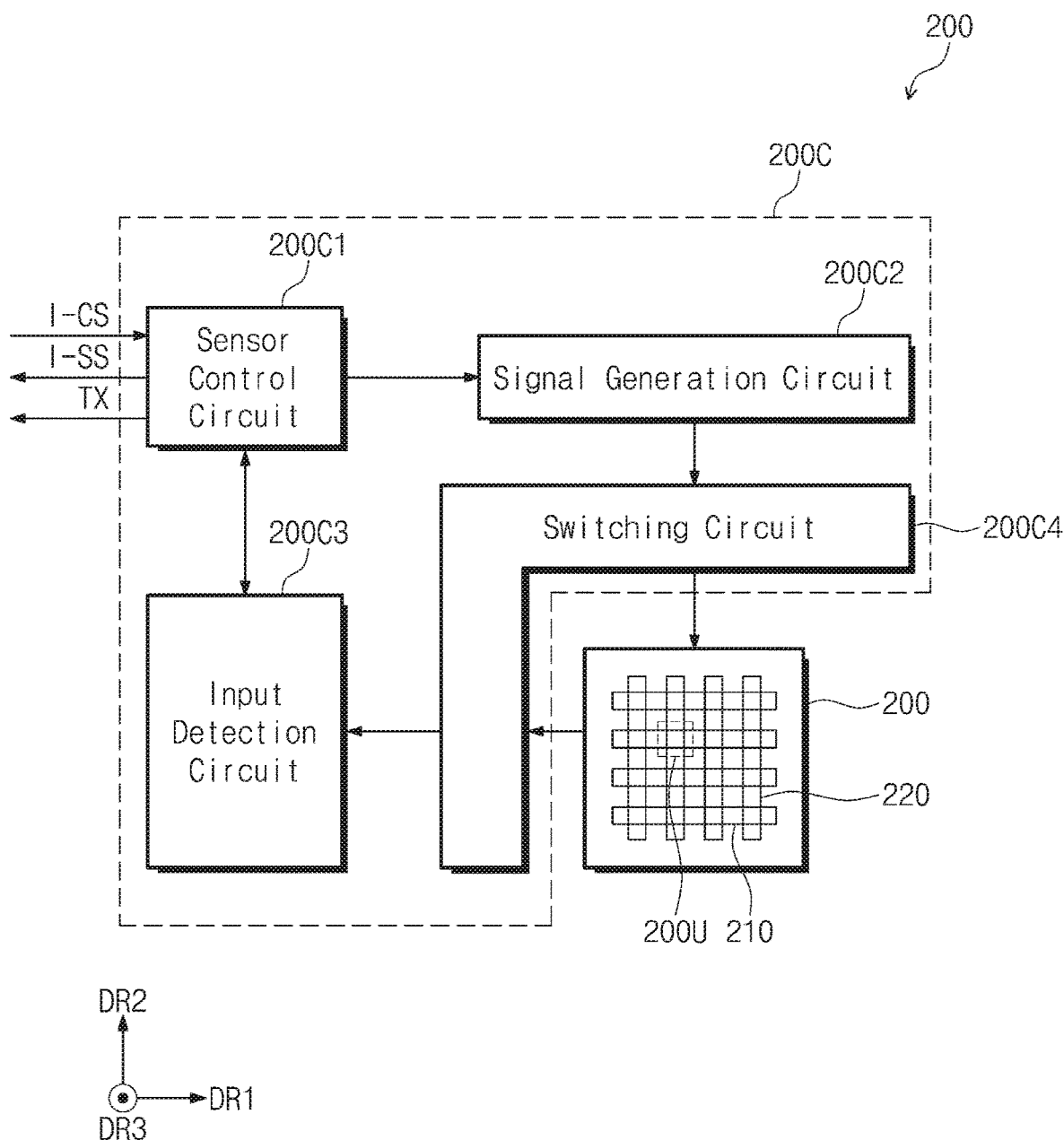
FIG. 6 is a block diagram of a sensor layer and a sensor driving part according to an embodiment of the present disclosure.

FIG. 6 is a block diagram of a sensor layer and a sensor driving part according to an embodiment of the present disclosure.

Referring to FIG. 6, the sensor layer 200 may include a plurality of electrodes 210 and a plurality of cross electrodes 220. The plurality of cross electrodes 220 may cross the plurality of electrodes 210. The sensor layer 200 may further include a plurality of signal lines connected to the plurality of electrodes 210 and the plurality of cross electrodes 220. Each of the plurality of electrodes 210 and the plurality of cross electrodes 220 may have a bar shape or a stripe shape. The plurality of electrodes 210 and the plurality of cross electrodes 220 having such a bar shape or a stripe shape may improve the sensing properties of consecutive linear inputs. However, the shape of the plurality of electrodes 210 and the plurality of cross electrodes 220 is not limited thereto.

The sensor driving part 200C may receive the sensor control signal I-CS from the main driving part 1000C, and may provide the coordinate signal I-SS to the main driving part 1000C (e.g., refer to FIG. 2).

The sensor driving part 200C may include a sensor control circuit 200C1, a signal generation circuit 200C2, an input detection circuit 200C3, and a switching circuit 200C4. The sensor control circuit 200C1, the signal generation circuit 200C2, and the input detection circuit 200C3 may be implemented in a single chip, or some parts thereof may be implemented in different chips.

The sensor control circuit 200C1 controls the operations of the signal generation circuit 200C2 and the switching circuit 200C4, calculates the coordinates of the external input from a driving signal received from the input detection circuit 200C3, and/or analyzes information transmitted from an active pen from a modulation signal received from the input detection circuit 200C3.

The signal generation circuit 200C2 may provide an output signal (or a driving signal) referred to as a transmission signal to the sensor layer 200. The signal generation circuit 200C2 outputs an output signal corresponding to an operation mode to the sensor layer 200.

The input detection circuit 200C3 may convert an analogue signal (e.g., referred to as a reception signal or a sensing signal) received from the sensor layer 200 to a digital signal. For example, the input detection circuit 200C3 amplifies and then filters the received analogue signal as a filtered signal. The input detection circuit 200C3 may convert the filtered signal to a digital signal.

The switching circuit 200C4 may selectively control an electrical connection between the sensor layer 200 and the signal generation circuit 200C2, and/or between the sensor layer 200 and the input detection circuit 200C3, according to control of the sensor control circuit 200C1. The switching circuit 200C4 may connect any suitable one group of the plurality of electrodes 210 and the plurality of cross electrodes 220 to the signal generation circuit 200C2, or may connect each of the plurality of electrodes 210 and the plurality of cross electrodes 220 to the signal generation circuit 200C2, according to the control of the sensor control circuit 200C1. As another example, the switching circuit 200C4 may connect one group or all of the plurality of electrodes 210 and the plurality of cross electrodes 220 to the input detection circuit 200C3.

In an embodiment of the present disclosure, the sensor control circuit 200C1 may generate a sensor signal TX based on the transmission signals provided to the sensor layer 200. The sensor signal TX may be a representative value of the transmission signals provided to the sensor layer 200 during one frame. In an embodiment, the sensor signal TX may be a sum signal of the transmission signals provided to the sensor layer 200.

Figure 7A:
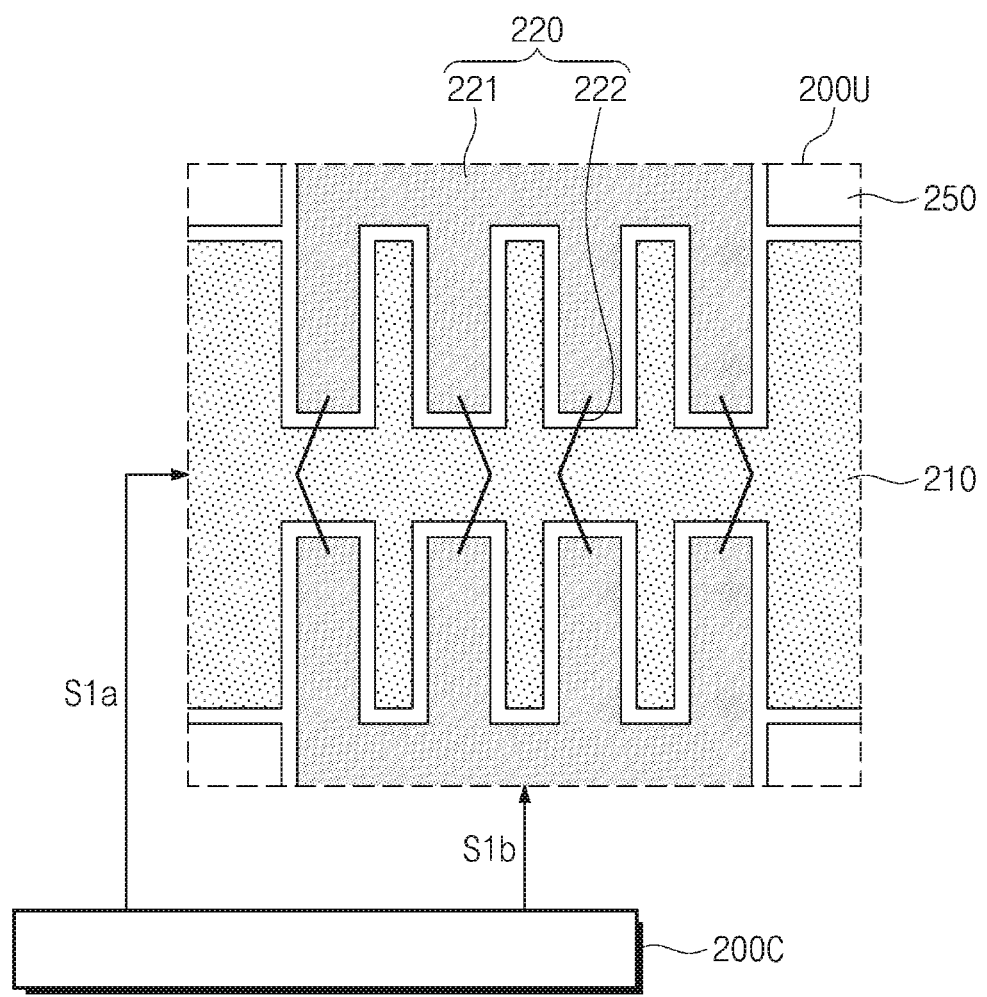
Figure 7C:
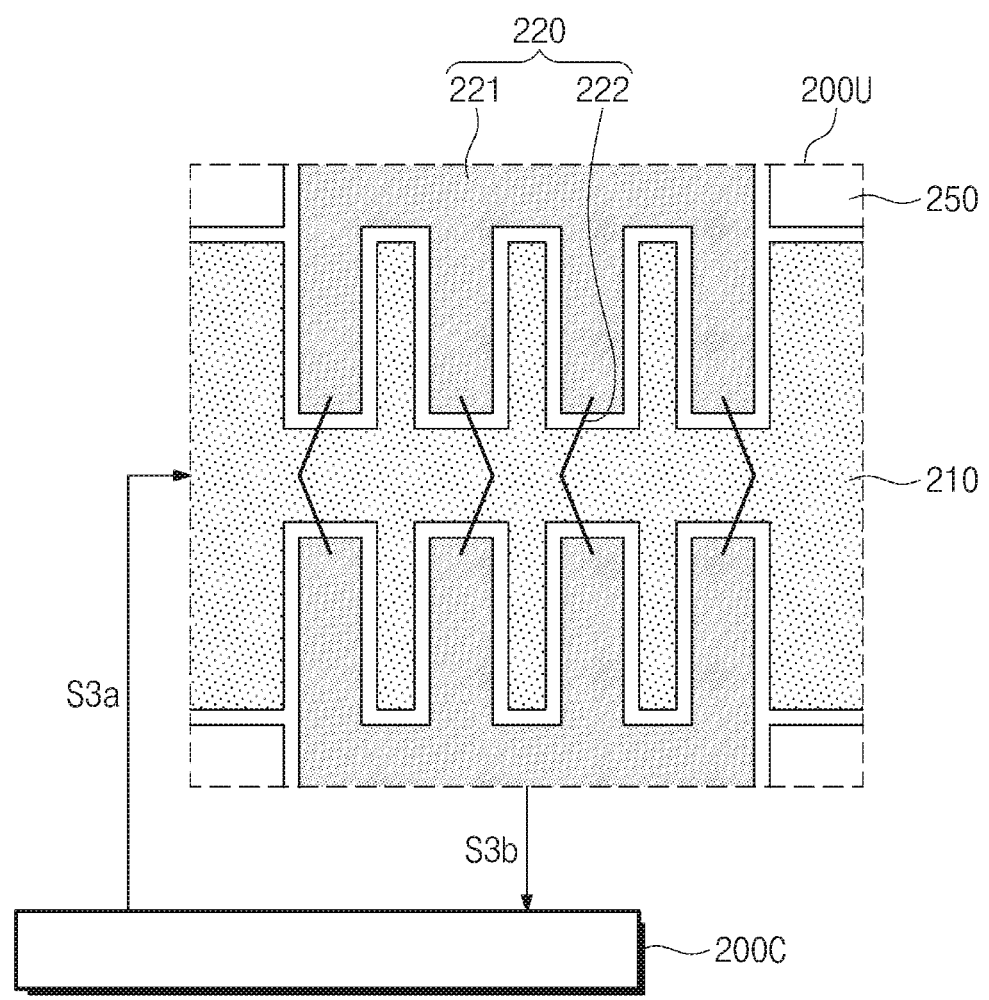

FIG. 7A, FIG. 7B, and FIG. 7C are views illustrating various operation modes of a sensor layer according to an embodiment of the present disclosure.

In FIG. 7A, FIG. 7B, and FIG. 7C, an enlarged view of one sensing part 200U is illustrated. Referring to FIG. 6, FIG. 7A, FIG. 7B, and FIG. 7C, the one sensing part 200U may include (e.g., may be defined as) a portion of one electrode 210 and a portion of one cross electrode 220.

The cross electrode 220 may include cross patterns 221, and bridge patterns 222 electrically connected to the cross patterns 221. The cross patterns 221 may be spaced apart from each other with the electrode 210 interposed therebetween. The bridge patterns 222 may overlap with the electrode 210, and the bridge patterns 222 may cross the electrode 210 while being insulated from the electrode 210.

The cross patterns 221 and the electrode 210 may be disposed at (e.g., in or on) the same layer as each other, and the bridge patterns 222 may be disposed at (e.g., in or on) a different layer from those of the cross patterns 221 and the electrode 210. In an embodiment, the cross patterns 221 and the electrode 210 may be included in the second conductive layer 204, and the bridge patterns 222 may be included in the first conductive layer 202 (e.g., refer to FIG. 4), which may be referred to as a bottom bridge structure. However, the present disclosure is not particularly limited thereto. In an embodiment, the cross patterns 221 and the electrode 210 may be included in the first conductive layer 202, and the bridge patterns 222 may be included in the second conductive layer 204 (e.g., refer to FIG. 4), which may be referred to as a top bridge structure.

In addition, the sensor layer 200 may further include a dummy pattern 250 disposed at (e.g., in or on) a region in which the cross patterns 221 and the electrode 210 are not disposed. The dummy pattern 250 may be a component provided to prevent or substantially prevent the electrode 210 and the cross electrode 330 from being observed (e.g., from being viewed) from the outside, and the dummy pattern 250 may be a pattern that is electrically floated. The dummy pattern 250 may be referred to as a pattern or a floating pattern.

Each of the cross patterns 221, the electrode 210, and the dummy pattern 250 may have a mesh structure. In this case, in each of the cross patterns 221, the electrode 210, and the dummy pattern 250, an opening may be defined. However, the present disclosure is not limited thereto. For example, in an embodiment, each of the cross patterns 221, the electrode 210, and the dummy pattern 250 may be a transparent through-electrode.

Referring to FIG. 2, FIG. 7A, and FIG. 7B, the first mode may be a mode in which the display device 1000 and the input device 2000 transmit/receive data with each other. The operation illustrated in FIG. 7A may be an operation in which the up-link signal ULS is provided from the display device 1000 to the input device 2000. The operation illustrated in FIG. 7B may be an operation in which the down-link signal DLS is provided from the input device 2000 to the display device 1000.

As illustrated in FIG. 2 and FIG. 7A, each of the electrode 210 and the cross electrode 220 may be utilized as a transmission electrode for providing transmission signals S1a and S1b, which may be provided from the sensor driving part 200C, to the input device 2000. In FIG. 7A, both the electrode 210 and the cross electrode 220 are illustrated as being utilized as the transmission electrodes, but the present disclosure is not particularly limited thereto. In an embodiment, either one of the electrode 210 or the cross electrode 220 may be utilized as the transmission electrode.

As illustrated in FIG. 2 and FIG. 7B, each of the electrode 210 and the cross electrode 220 may be utilized as a reception electrode for transferring sensing signals S2a and S2b induced from the input device 2000 to the sensor driving part 200C. The sensor driving part 200C may receive a first sensing signal S2a from the electrode 210, and may receive a second sensing signal S2b from the cross electrode 220.

FIG. 7C is a view illustrating a sensor layer operating in a second mode according to an embodiment of the present disclosure.

Referring to FIG. 2, FIG. 6, and FIG. 7C, in the second mode, the sensor driving part 200C may sense the second input by the touch 3000. In the second mode, the sensor driving part 200C may sense an external input by sensing an amount of change in a mutual capacitance formed between the electrode 210 and the cross electrode 220.

The sensor driving part 200C may provide an output signal S3a to the electrode 210, and may receive a sensing signal S3b from the cross electrode 220. In other words, in the second mode, the electrode 210 may function as a transmission electrode, and the cross electrode 220 may function as a reception electrode. However, the present disclosure is not particularly limited thereto. In an embodiment, the electrode 210 may function as a reception electrode, and the cross electrode 220 may function as a transmission electrode.

According to an embodiment of the present disclosure, the sensor driving part 200C may generate the sensor signal TX based on the transmission signals S1a and S1b. The sensor signal TX may be a representative value of the transmission signals S1a and S1b provided to the electrode 210 and the cross electrode 220 of the sensor layer 200 during one frame. In an embodiment, the sensor signal TX may be a sum signal of the transmission signals S1a and S1b provided to the electrode 210 and the cross electrode 220 of the sensor layer 200.

Figure 8:
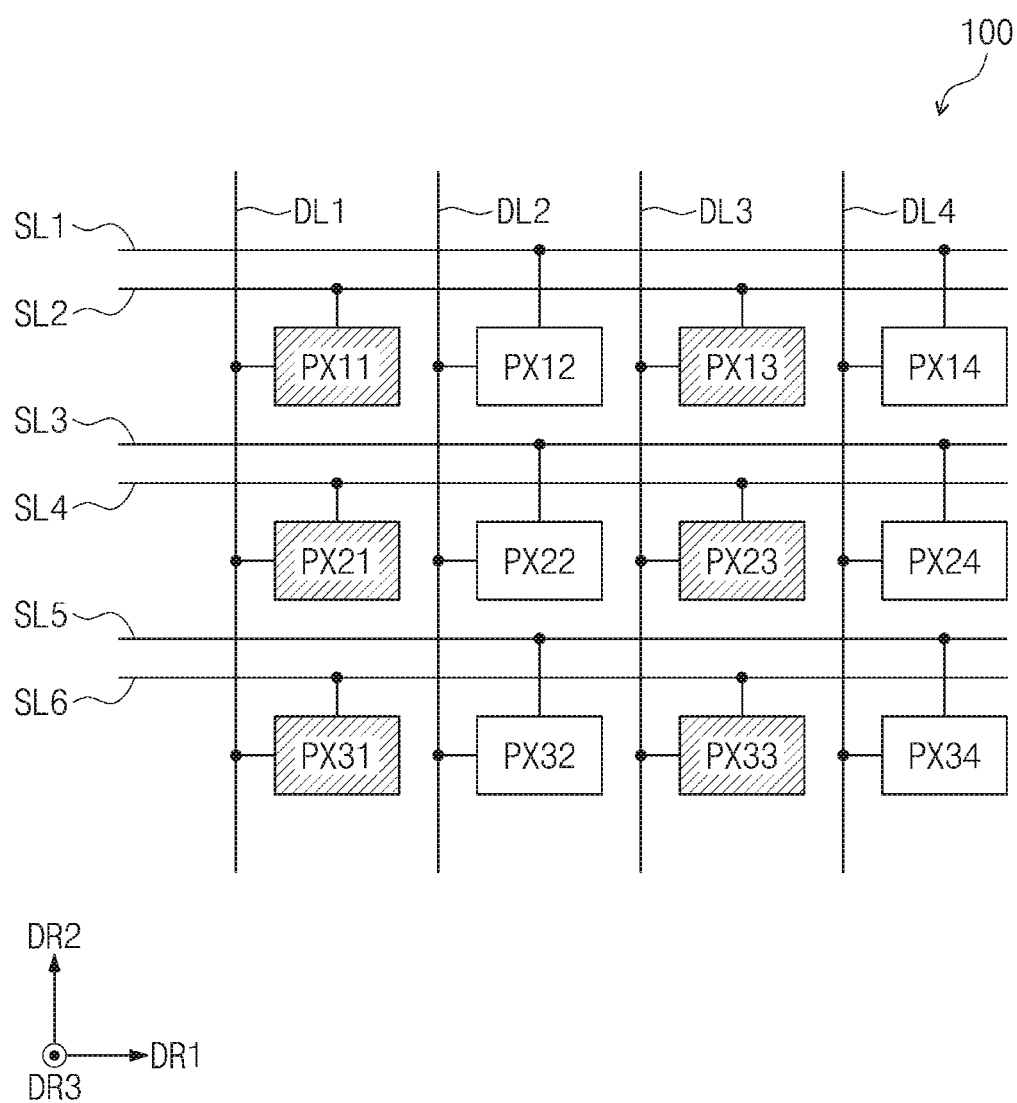
FIG. 8 is a view showing scan lines, data lines, and pixels of a display layer.

FIG. 8 is a showing scan lines, data lines, and pixels of a display layer.

Referring to FIG. 8, the display layer 100 includes pixels PX11 to PX14, PX21 to PX24, and PX31 to PX34 arranged in the first direction DR1 and the second direction DR2. Each of the pixels PX11 to PX14, PX21 to PX24, and PX31 to PX34 may be electrically connected to one corresponding scan line from among the scan lines SL1 to SL6, and to one corresponding data line from among data lines DL1 to DL4.

FIG. 8 illustrates that a number of the pixels PX11 to PX14, PX21 to PX24, and PX31 to PX34 that are arranged in one row in the first direction DR1 is 4, and that a number of the pixels PX11 to PX14, PX21 to PX24, and PX31 to PX34 that are arranged in one column in the second direction DR2 is 3, but the present disclosure is not limited thereto.

The scan lines SL1 to SL6 may be divided into first scan lines SL1, SL3, and SL5, and second scan lines SL2, SL4, and SL6.

The first scan lines SL1, SL3, and SL5 and the second scan lines SL2, SL4, and SL6 are extended in the first direction DR1, and the data lines DL1 to DL4 are extended in the second direction DR2.

From among the pixels PX11 to PX14, PX21 to PX24, and PX31 to PX34, a first group of pixels PX11, PX13, PX21, PX23, PX31, and PX33 that are connected to odd-numbered data lines DL1 and DL3 may be electrically connected to the second scan lines SL2, SL4, and SL6, and a second group of pixels PX12, PX14, PX22, PX24, PX32, and PX34 that are connected to even-numbered data lines DL2 and DL4 may be electrically connected to the first scan lines SL1, SL3, and SL5.

In another embodiment, the first group of pixels PX11, PX13, PX21, PX23, PX31, and PX33 may be electrically connected to the first scan lines SL1, SL3, and SL5, and the second groups of pixels PX12, PX14, PX22, PX24, PX32, and PX34 may be electrically connected to the second scan lines SL2, SL4, and SL6.

Figure 9:
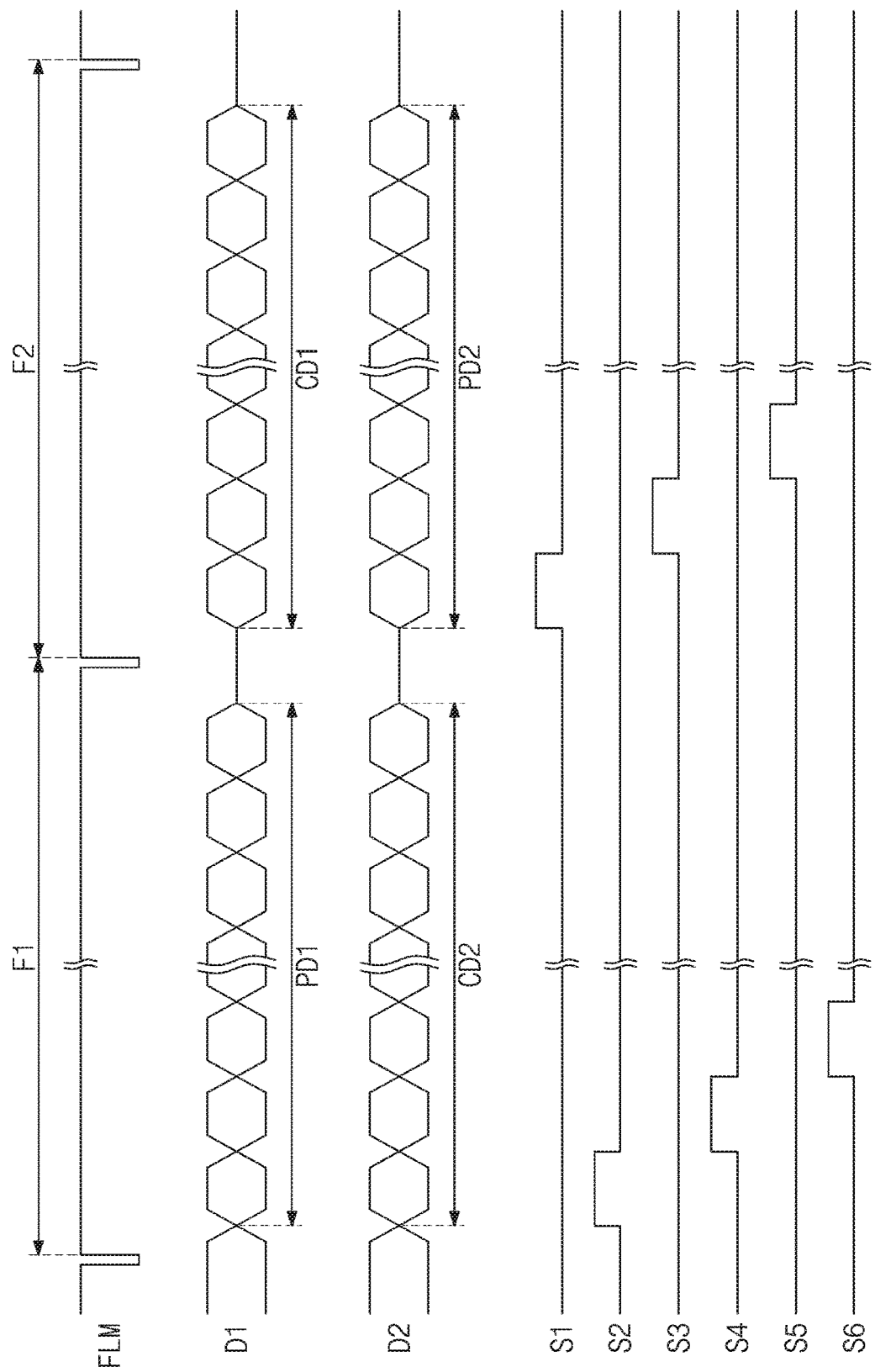
FIG. 9 is a timing diagram showing scan signals provided to the scan lines and data signals provided to the data lines of the display layer illustrated in FIG. 8.

FIG. 9 is a timing diagram showing scan signals provided to the scan lines and data signals provided to the data lines of the display layer illustrated in FIG. 8.

FIG. 9 illustrates only the data signals D1 and D2 provided to data lines DL1 and DL2 from among the data lines DL1 to DL4 illustrated in FIG. 8. The data lines DL3 and DL4 illustrated in FIG. 8 may be driven in the same or substantially the same manner as those of the data lines DL1 and DL2, and thus, redundant description thereof may not be repeated.

Referring to FIG. 5, FIG. 8, and FIG. 9, a start signal FLM may be a signal included in the first control signal CONT1 that is provided from the signal control circuit 100C1 to the scan driving circuit 100C2. The start signal FLM may be a signal indicating the start of one frame.

The scan driving circuit 100C2 may sequentially output scan signals S1 to S6 having an active level (for example, a high level) in synchronization with the start signal FLM. The scan signals S1 to S6 may be provided to the scan lines SL1 to SL6, respectively.

In an embodiment, the scan driving circuit 100C2 sequentially outputs second scan signals S2, S4, and S6 having an active level to be provided to the first scan lines SL2, SL4, and SL6 during a first frame F1, and maintains or substantially maintains the first scan signals S1, S3, and S5 to have an inactive level to be provided to the second scan lines SL1 SL3, and SL5 during the same first frame F1.

The scan driving circuit 100C2 sequentially outputs the first scan signals S1, S3, and S5 having an active level to be provided to the second scan lines SL1, SL3, and SL5 during a second frame F2 immediately following the first frame F1, and maintains or substantially maintains the second scan signals S2, S4, and S6 to have an inactive level to be provided to the first scan lines SL2, SL4, and SL6 during the same second frame F2.

A data signal D1 provided to the data line DL1 by the data driving circuit 100C3 during the first frame F1 may be a pixel data signal PD1 corresponding to the image data signal DS provided from the signal control circuit 100C1. A data signal D2 provided to the data line DL2 during the first frame F1 may be a compensation signal CD2.

The data signal D1 provided to the data line DL1 during the second frame F2 may be a compensation signal CD1. The data signal D2 provided to the data line DL2 during the second frame F2 may be a pixel data signal PD2 corresponding to the image data signal DS provided from the signal control circuit 100C1.

Therefore, the first group of pixels PX11, PX21, and PX31 that are connected to the data line DL1 illustrated in FIG. 8 may receive the pixel data signal PD1 through the data line DL1 in the first frame F1, and may display an image corresponding to the pixel data signal PD1 in response to the second scan signals S2, S4, and S6. The first group of pixels PX11, PX21, and PX31 that are connected to the data line DL1 may receive the compensation signal CD1 through the data line DL1 in the second frame F2, but may not display an image corresponding to the compensation signal CD1, because the second scan signals S2, S4, and S6 are at an inactive level during the second frame F2.

The compensation signal CD1 may be a signal that is complimentary to the pixel data signal PD2 provided to an adjacent data line, for example, such as the data line DL2. A signal that is complimentary to the pixel data signal PD2 may be a signal having a voltage level that is complimentary to a gray scale voltage (e.g., a gray level voltage) of the pixel data signal PD2. The compensation signal CD2 may be a signal that is complimentary to the pixel data signal PD1 provided to an adjacent data line, for example, such as the data line DL1. A signal that is complimentary to the pixel data signal PD1 may be a signal having a voltage level that is complimentary to a gray scale voltage (e.g., a gray level voltage) of the pixel data signal PD1.

For example, each of pixel data signals PD1 and PD2 may have a minimum voltage level of 3.6 V, a maximum voltage level of 6.6 V, and a central voltage level CV of 5.1 V. In this case, a compensation signal that is complimentary to the pixel data signal PD1 may be equal to or substantially equal to (CV−PD1)+CV. For example, when the voltage level of the pixel data signal PD1 is 4 V, the voltage level of a complimentary signal thereto is (5.1-4)+5.1 V=6.1 V. For example, when the voltage level of the pixel data signal PD1 is 5.5 V, the voltage level of a complimentary signal thereto is (5.1-5.5)+5.1 V=4.7 V.

In an embodiment, the voltage level of a compensation signal may be opposite to a polarity of the pixel data signal PD1 based on the central voltage level CV. In an embodiment, when the voltage level of the pixel data signal PD1 is 4 V, the voltage level of a compensation signal thereto may be selected from a range that is higher than the central voltage level CV (for example, such as less than or equal to 6.6 V and greater than or equal to 5.1 V). In an embodiment, when the voltage level of the pixel data signal PD1 is 5.5 V, the voltage level of a compensation signal thereto may be selected from a range that is lower than the central voltage level CV (for example, such as less than or equal to 5.1 V and greater than or equal to 3.6 V).

However, the present disclosure is not limited thereto, and the specific voltage levels of the compensation signal described above is provided as an illustrative example.

Referring again to FIG. 4, the change in the parasitic capacitance Ca between the data line DL of the display layer 100 and the second electrode CE may act as noise in the second conductive layer 204 through the parasitic capacitance Cb.

By providing the compensation signal CD2 to the data line DL2 having a voltage level that is complimentary to the gray scale voltage of the pixel data signal PD1 provided to the data line DL1 in the first frame F1, a coupling capacitance between the data line DL1 and the second electrode CE may be offset by a coupling capacitance between the data line DL2 and the second electrode CE.

By providing the compensation signal CD1 to the data line DL1 having a voltage level that is complimentary to the gray scale voltage of the pixel data signal PD2 provided to the data line DL2 in the second frame F2, the coupling capacitance between the data line DL2 and the second electrode CE may be offset by the coupling capacitance between the data line DL1 and the second electrode CE. Therefore, it may be possible to prevent or substantially prevent the sensing sensitivity of the sensor layer 200 from being deteriorated by a signal transmitted through the display layer 100.

In another embodiment, the compensation signal may be a signal that is complimentary to an average of the pixel data signals provided to one or more adjacent data lines. In an embodiment, the compensation signal CD2 provided to the data line DL2 may be the average of the pixel data signals provided through the data lines DL1 and DL3.

Figure 10:
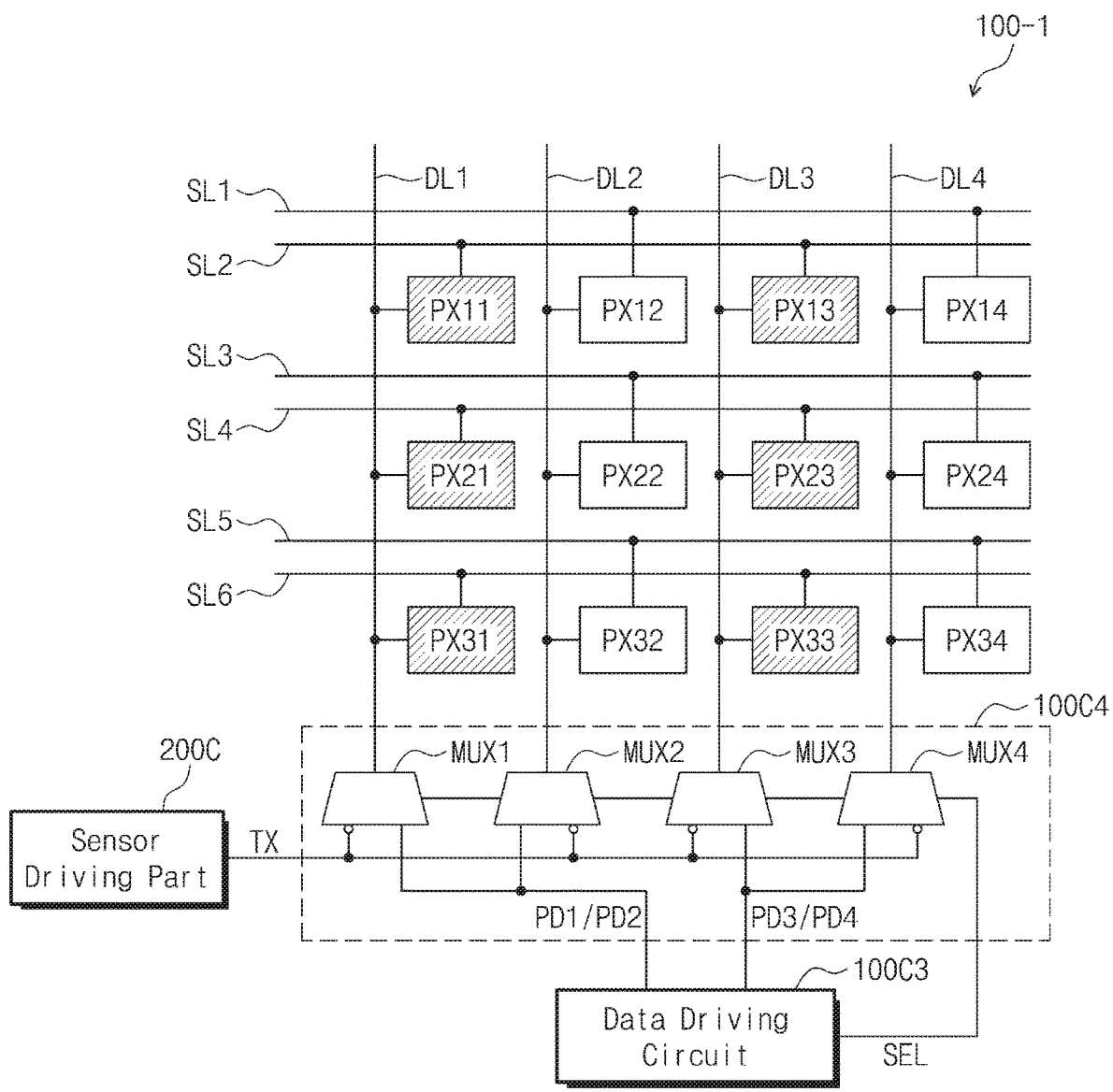
FIG. 10 is a view showing a display layer according to another embodiment of the present disclosure.

FIG. 10 is a view showing a display layer according to another embodiment of the present disclosure.

Referring to FIG. 10, a display layer 100-1 includes pixels PX11 to PX14, PX21 to PX24, and PX31 to PX34, scan lines SL1 to SL6, data lines DL1 to DL4, and a selection circuit 100C4.

The pixels PX11 to PX14, PX21 to PX24, and PX31 to PX34, the scan lines SL1 to SL6, and the data lines DL1 to DL4 may be the same or substantially the same as, and are provided with the same reference symbols as those of, the pixels PX11 to PX14, PX21 to PX24, and PX31 to PX34, the scan lines SL1 to SL6, and the data lines DL1 to DL4 of one or more embodiments described above, and thus, redundant description thereof may not be repeated.

The selection circuit 100C4 receives a selection signal SEL, pixel data signals PD1, PD2, PD3, and PD4, and compensation signals CD1 and CD2 from the data driving circuit 100C3, and outputs data signals to the data lines DL1 to DL4.

The selection circuit 100C4 may be formed through the same or substantially the same process as that of the circuit layer 120 (e.g., refer to FIG. 4) in the display layer 100-1, but the present disclosure is not limited thereto. In an embodiment, the selection circuit 100C4 may be formed as part of (e.g., inside) the data driving circuit 100C3.

The selection circuit 100C4 includes multiplexers MUX1 to MUX4. The multiplexers MUX1 to MUX4 may correspond to (e.g., may be connected to) the data lines DL1 to DL4, respectively. In other words, depending on the number of the data lines DL1 to DL4, the number of the multiplexers MUX1 to MUX4 provided in the selection circuit 100C4 may be determined.

A multiplexer MUX1 outputs one of a complimentary signal of the sensor signal TX or a pixel data signal PD1 to a data line DL1 in response to the selection signal SEL. A multiplexer MUX2 outputs one of a pixel data signal PD2 or a complimentary signal of the sensor signal TX to a data line DL2 in response to the selection signal SEL. A multiplexer MUX3 outputs one of a complimentary signal of the sensor signal TX or a pixel data signal PD3 to a data line DL3 in response to the selection signal SEL. A multiplexer MUX4 outputs one of a pixel data signal PD4 or a complimentary signal of the sensor signal TX to a data line DL4 in response to the selection signal SEL.

Figure 11:
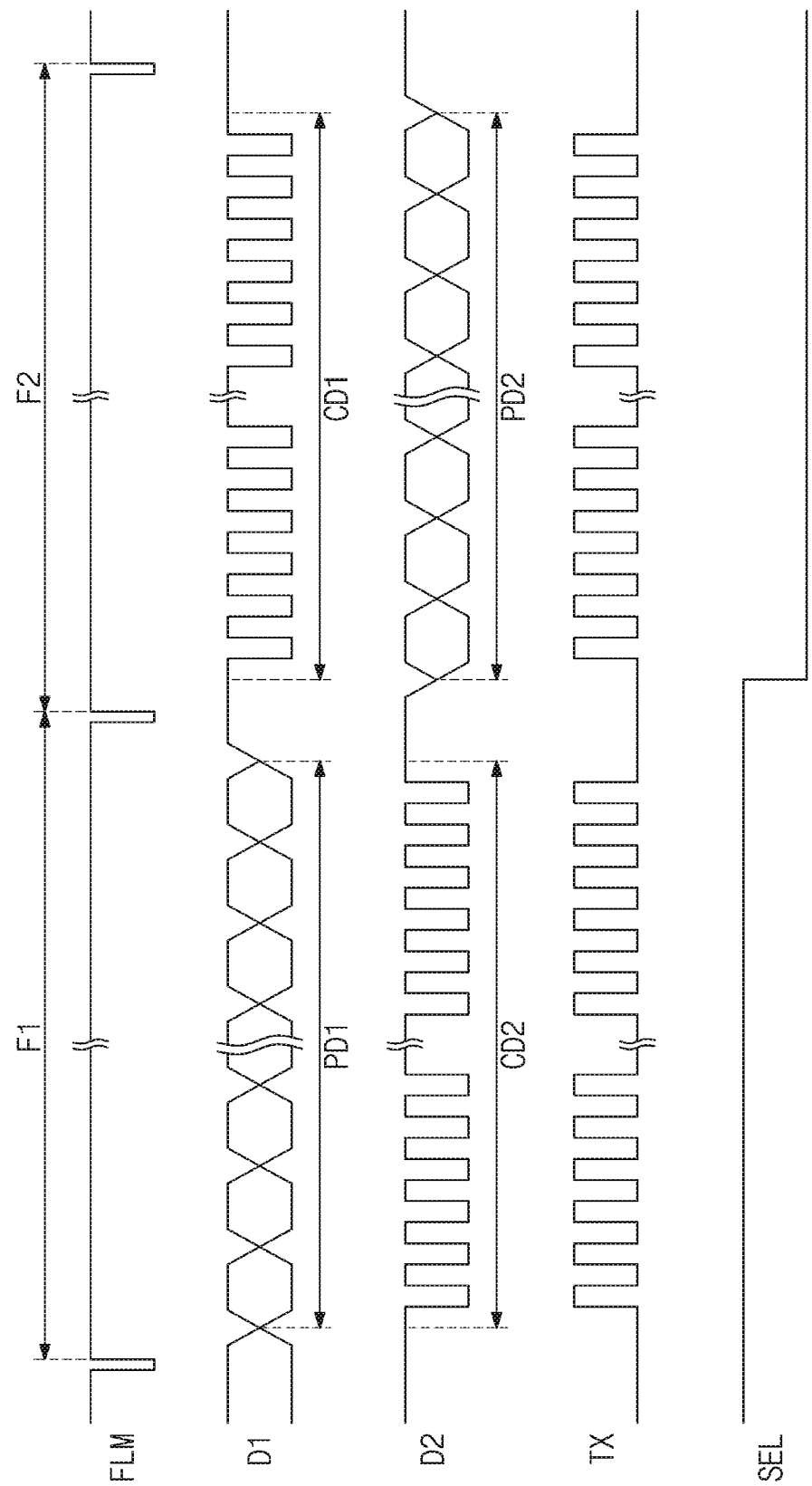
FIG. 11 is a timing diagram showing data signals provided to the data lines of the display layer illustrated in FIG. 10.

FIG. 11 is a timing diagram showing data signals provided to the data lines of the display layer 100-1 illustrated in FIG. 10.

FIG. 11 illustrates only the data signals D1 and D2 provided to the data lines DL1 and DL2 from among the data lines DL1 to DL4 illustrated in FIG. 10. The data lines DL3 and DL4 illustrated in FIG. 10 may be driven in the same or substantially the same manner as those of the data lines DL1 and DL2, and thus, redundant description thereof may not be repeated.

In FIG. 11, the scan signals provided to the scan lines SL1 to SL6 illustrated in FIG. 10 are not illustrated. The scan signals provided to the scan lines SL1 to SL6 illustrated in FIG. 10 may have the same or substantially the same signal waveform as those of the scan signals S1 to S6 illustrated in FIG. 9, and thus, redundant description thereof may not be repeated.

Referring to FIG. 5, FIG. 10, and FIG. 11, during the first frame F1, the data driving circuit 100C3 outputs the pixel data signal PD1 to be provided to the data line DL1, and outputs the selection signal SEL having a first level (for example, a high level).

The multiplexer MUX1 outputs the pixel data signal PD1 as the data signal D1 to the data line DL1 in response to the selection signal SEL having the first level. The multiplexer MUX2 outputs the compensation signal CD2, which is a complimentary signal of the sensor signal TX, as the data signal D2 to the data line DL2 in response to the selection signal SEL having the first level.

During the second frame F2, the data driving circuit 100C3 outputs the pixel data signal PD2 to be provided to the data line DL2, and outputs the selection signal SEL having a second level (for example, a low level).

The multiplexer MUX1 outputs the compensation signal CD1, which is a complimentary signal of the sensor signal TX, as the data signal D1 to the data line DL1 in response to the selection signal SEL having the second level. The multiplexer MUX2 outputs the pixel data signal PD2 as the data signal D2 to the data line DL2 in response to the selection signal SEL having the second level.

Referring again to FIG. 4, the change in the parasitic capacitance Cb between the second conductive layer 204 and the second electrode CE may act as noise in the data line DL of the display layer 100 through the parasitic capacitance Ca.

By generating the sensor signal TX based on the transmission signals S1a and S1b (e.g., refer to FIG. 7A) provided to the electrodes 210 and the cross electrodes 220 in the first frame F1, and providing the compensation signal CD2, which is a complimentary signal of the sensor signal TX, to the data line DL2, the parasitic capacitance Cb between the second conductive layer 204 and the second electrode CE may be offset by the coupling capacitance between the data line DL2 and the second electrode CE.

By generating the sensor signal TX based on the transmission signals S1a and S1b (e.g., refer to FIG. 7A) provided to the electrodes 210 and the cross electrodes 220 in the second frame F2, and providing the compensation signal CD1, which is a complimentary signal of the sensor signal TX, to the data line DL1, the parasitic capacitance Cb between the second conductive layer 204 and the second electrode CE may be offset by the coupling capacitance between the data line DL1 and the second electrode CE.

Figure 12:
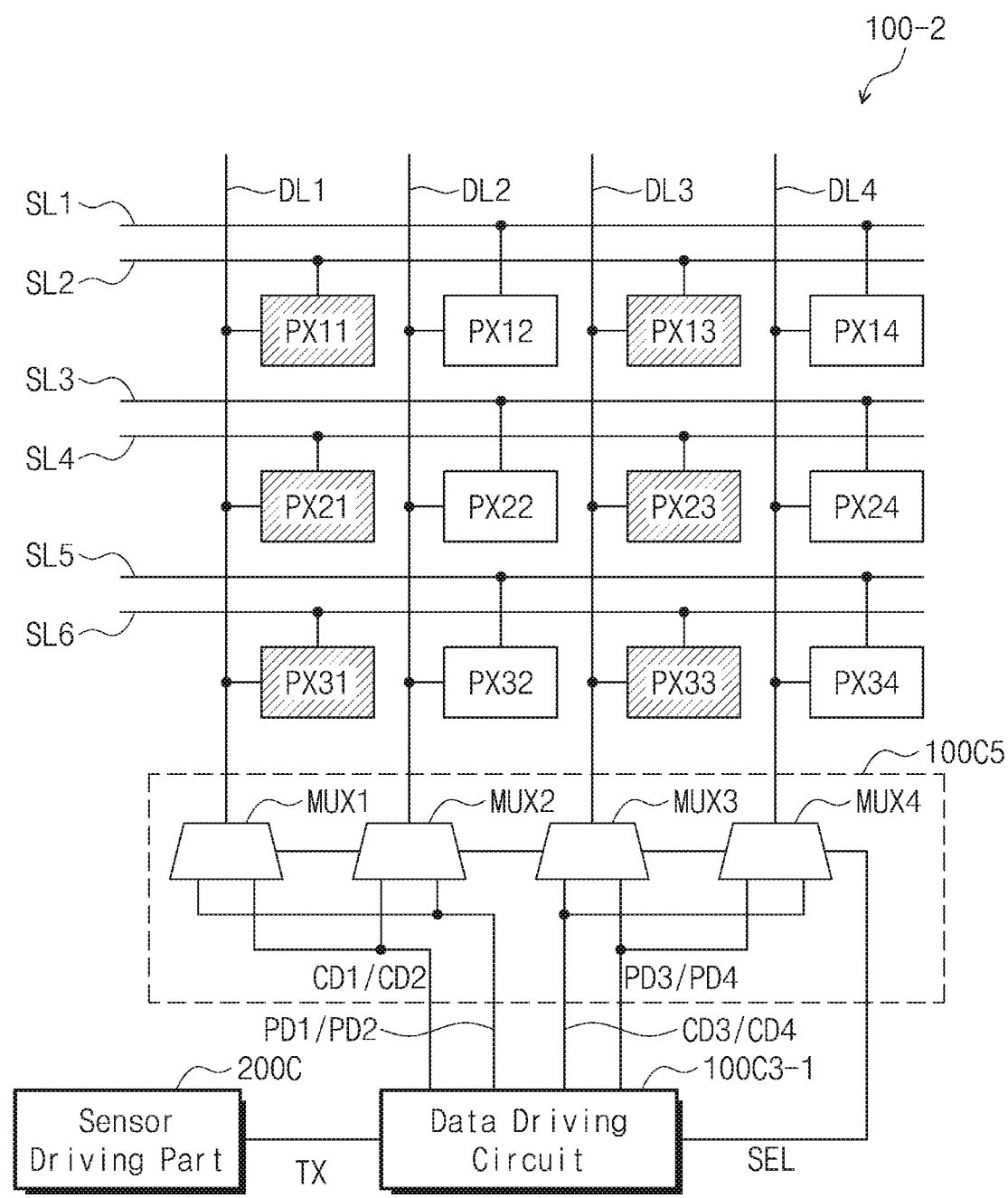
FIG. 12 is a view showing a display layer according to another embodiment of the present disclosure.

FIG. 12 is a view showing a display layer according to another embodiment of the present disclosure.

Referring to FIG. 12, a display layer 100-2 includes pixels PX11 to PX14, PX21 to PX24, and PX31 to PX34, scan lines SL1 to SL6, data lines DL1 to DL4, and a selection circuit 100C5.

The pixels PX11 to PX14, PX21 to PX24, and PX31 to PX34, the scan lines SL1 to SL6, and the data lines DL1 to DL4 of the display layer 100-2 illustrated in FIG. 12 may be the same or substantially the same as, and are provided with the same reference symbols as those of, the pixels PX11 to PX14, PX21 to PX24, and PX31 to PX34, the scan lines SL1 to SL6, and the data lines DL1 to DL4 of the display layer 100 illustrated in FIG. 8, and thus, redundant description thereof may not be repeated.

The selection circuit 100C5 receives a selection signal SEL, pixel data signals PD1, PD2, PD3, and PD4, and compensation signals CD1 and CD2 from a data driving circuit 100C3-1, and outputs data signals to the data lines DL1 to DL4.

The selection circuit 100C5 includes multiplexers MUX1 to MUX4. The multiplexers MUX1 to MUX4 may correspond to (e.g., may be connected to) the data lines DL1 to DL4, respectively. In other words, depending on the number of the data lines DL1 to DL4, the number of the multiplexers MUX1 to MUX4 provided in the selection circuit 100C5 may be determined.

A multiplexer MUX1 outputs one of a compensation signal CD1 or a pixel data signal PD1 to a data line DL1 in response to the selection signal SEL. A multiplexer MUX2 outputs one of a pixel data signal PD2 or a compensation signal CD2 to a data line DL2 in response to the selection signal SEL. A multiplexer MUX3 outputs one of a compensation signal CD3 or a pixel data signal PD3 to a data line DL3 in response to the selection signal SEL. A multiplexer MUX4 outputs one of a pixel data signal PD4 or a compensation signal CD4 to a data line DL4 in response to the selection signal SEL.

Figure 13:
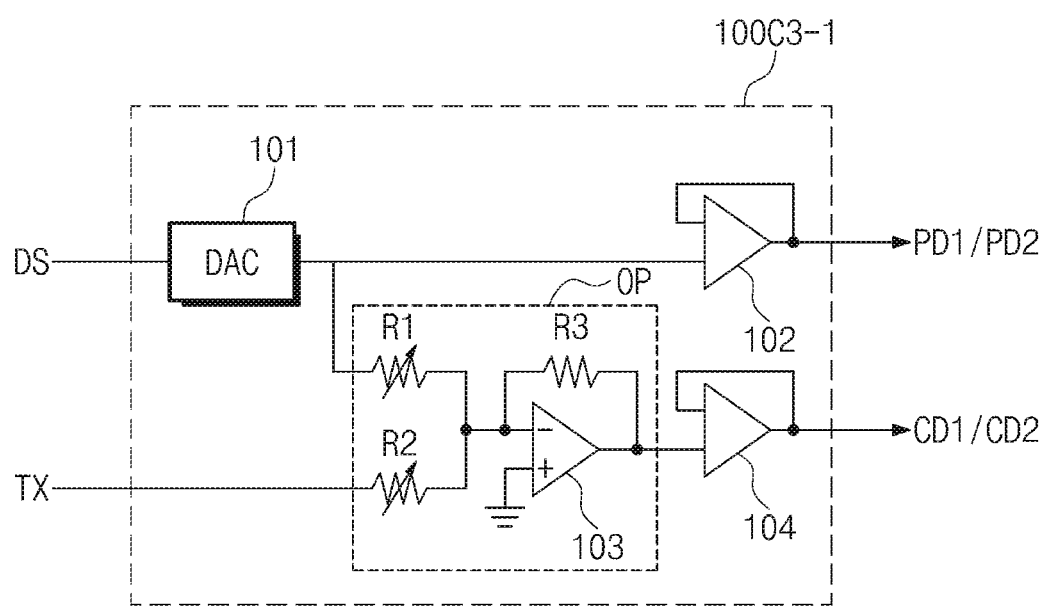
FIG. 13 is a circuit diagram showing a data driving circuit illustrated in FIG. 12.

FIG. 13 is a circuit diagram showing a data driving circuit illustrated in FIG. 12.

FIG. 13 illustrates only a part of the data driving circuit 100C3-1 relating to the output of the compensation signals CD1 and CD2. However, the data driving circuit 100C3-1 is not limited to the circuit illustrated in FIG. 13, and may further include other circuit components for performing various other suitable functions.

Referring to FIG. 12 and FIG. 13, the data driving circuit 100C3-1 includes a digital-to-analog converter 101, buffers 102 and 104, an operational amplifier 103, and resistors R1, R2, and R3.

The digital-to-analog converter 101 converts the image data signal DS provided from the signal control circuit 100C1 (e.g., refer to FIG. 5) to an analog signal. A buffer 102 outputs the analog signal that is output from the digital-to-analog converter 101 as the pixel data signals PD1 and PD2. In an embodiment, a signal output from the buffer 102 in the first frame F1 (e.g., refer to FIG. 14) may be the pixel data signal PD1, and a signal output from the buffer 102 in the second frame F2 (e.g., refer to FIG. 14) may be the pixel data signal PD2.

The resistors R1, R2, and R3 and the operational amplifier 103 may constitute (e.g., may form or may be included in) an inverting amplifier OP. The inverting amplifier OP may output a complimentary signal of the sum of the analog signal output from the digital-to-analog converter 101 and the sensor signal TX output from the sensor driving part 200C. Resistors R1 and R2 may be variable resistors.

A buffer 104 may output a signal output from the inverting amplifier OP as the compensation signals CD1 and CD2. In an embodiment, a signal output from the buffer 104 in the first frame F1 (e.g., refer to FIG. 14) may be the compensation signal CD2, and a signal output from the buffer 104 in the second frame F2 (e.g., refer to FIG. 14) may be the compensation signal CD1.

When the analog signal output from the digital-to-analog converter 101 is (A), and the sensor signal TX output from the sensor driving part 200C is (B), the compensation signal CD1 may be calculated by Equation 1 below.

$$\text{Compensation signal } CD1 = a*A + b*B \quad \text{[Equation 1]}$$

In Equation 1, each of a and b may be constants representing a reflection ratio of the analog signal (A) output from the digital-to-analog converter 101 and the sensor signal (B) output from the sensor driving part 200C.

The resistance values of the resistors R1 and R2 may be determined according to the constants a and b.

Figure 14:
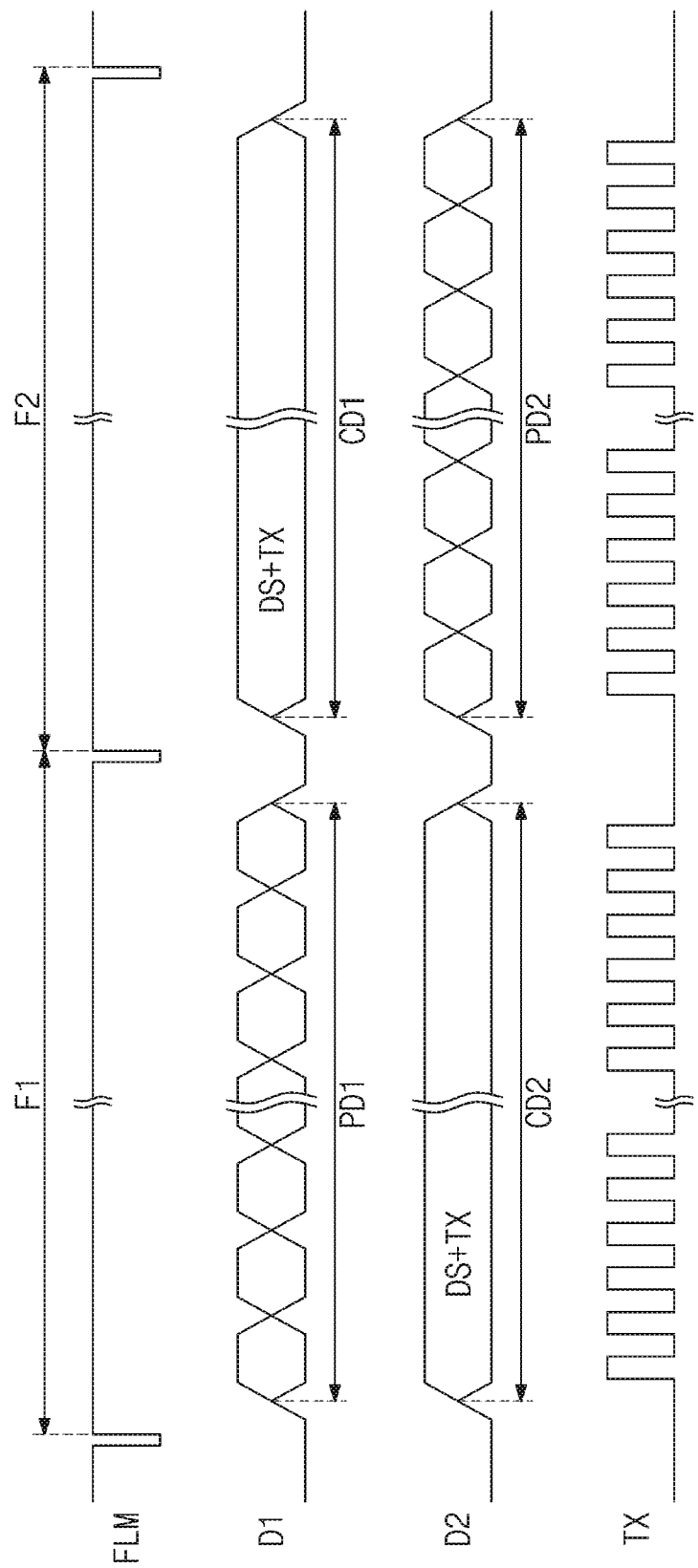
FIG. 14 is a timing diagram showing data signals provided to the data lines of the display layer illustrated in FIG. 12.

FIG. 14 is a timing diagram showing data signals provided to the data lines of the display layer 100-2 illustrated in FIG. 12.

FIG. 14 illustrates only the data signals D1 and D2 provided to the data lines DL1 and DL2 from among the data lines DL1 to DL4 illustrated in FIG. 12. The data lines DL3 and DL4 illustrated in FIG. 12 may be driven in the same or substantially the same manner as those of the data lines DL1 and DL2, and thus, redundant description thereof may not be repeated.

In FIG. 14, the scan signals provided to the scan lines SL1 to SL6 illustrated in FIG. 12 are not illustrated. The scan signals provided to the scan lines SL1 to SL6 illustrated in FIG. 12 may have the same or substantially the same signal waveform as those of the scan signals S1 to S6 illustrated in FIG. 9, and thus, redundant description thereof may not be repeated.

Referring to FIG. 5, FIG. 12, and FIG. 14, during the first frame F1, the data driving circuit 100C3-1 outputs the pixel data signal PD1 to be provided to the data line DL1, the compensation signal CD2 to be provided to the data line DL2, and the selection signal SEL having a first level (for example, a high level).

The multiplexer MUX1 outputs the pixel data signal PD1 as the data signal D1 to the data line DL1 in response to the selection signal SEL having the first level. The multiplexer MUX2 outputs the compensation data signal CD2 as the data signal D2 to the data line DL2 in response to the selection signal SEL having the first level.

During the second frame F2, the data driving circuit 100C3-1 outputs the compensation signal CD1 to be provided to the data line DL1, the pixel data signal PD2 to be provided to the data line DL2, and the selection signal SEL having a second level (for example, a low level).

The multiplexer MUX1 outputs the compensation data signal CD1 as the data signal D1 to the data line DL1 in response to the selection signal SEL having the second level. The multiplexer MUX2 outputs the pixel data signal PD2 as the data signal D2 to the data line DL2 in response to the selection signal SEL having the second level.

Referring again to FIG. 4, the change in the parasitic capacitance Cb between the second conductive layer 204 and the second electrode CE may act as noise in the data line DL of the display layer 100 through the parasitic capacitance Ca.

By providing the transmission signals S1a and S1b (e.g., refer to FIG. 7A) provided to the electrodes 210 and the cross electrodes 220 in the first frame F1, and the compensation signal CD2 to the data line DL2, which is generated based on the gray scale voltage of the pixel data signal PD1 provided to the data line DL1, the parasitic capacitance Cb between the second conductive layer 204 and the second electrode CE (e.g., refer to FIG. 4) may be offset by the coupling capacitance between the data line DL2 and the second electrode CE.

By providing the compensation signal CD1 to the data line DL1, which is generated based on the transmission signals S1a and S1b (e.g., refer to FIG. 7A) provided to the electrodes 210 and the cross electrodes 220 in the second frame F2, the parasitic capacitance Cb between the second conductive layer 204 and the second electrode CE (e.g., refer to FIG. 4) may be offset by the coupling capacitance between the data line DL1 and the second electrode CE.

Figure 15:
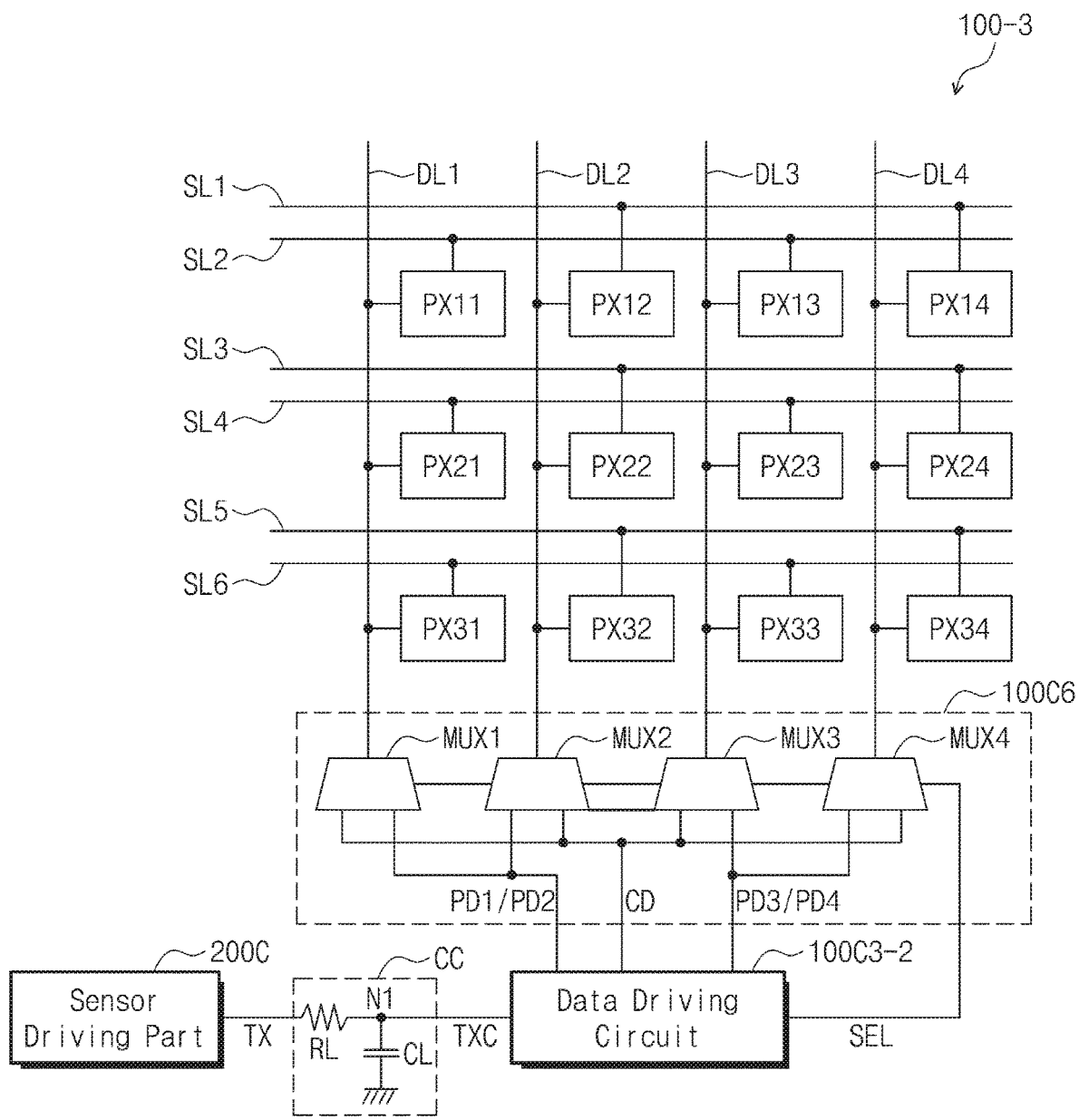
FIG. 15 is a view showing a display layer according to another embodiment of the present disclosure.

FIG. 15 is a view showing a display layer according to another embodiment of the present disclosure.

Referring to FIG. 15, a display layer 100-3 includes pixels PX11 to PX14, PX21 to PX24, and PX31 to PX34, scan lines SL1 to SL6, data lines DL1 to DL4, and a selection circuit 100C6.

The pixels PX11 to PX14, PX21 to PX24, and PX31 to PX34, the scan lines SL1 to SL6, and the data lines DL1 to DL4 of the display layer 100-3 illustrated in FIG. 15 may be the same or substantially the same as, and are provided with the same reference symbols as those of, the pixels PX11 to PX14, PX21 to PX24, and PX31 to PX34, the scan lines SL1 to SL6, and the data lines DL1 to DL4 of the display layer 100 illustrated in FIG. 8, and thus, redundant description thereof may not be repeated.

The selection circuit 100C6 receives a selection signal SEL, pixel data signals PD1, PD2, PD3, and PD4, and a compensation signal CD from a data driving circuit 100C3-2, and outputs data signals to the data lines DL1 to DL4.

The selection circuit 100C6 includes multiplexers MUX1 to MUX4. The multiplexers MUX1 to MUX4 may correspond to (e.g., may be connected to) the data lines DL1 to DL4, respectively. In other words, according to the number of the data lines DL1 to DL4, the number of the multiplexers MUX1 to MUX4 provided in the selection circuit 100C6 may be determined.

The compensation signal CD output from the data driving circuit 100C3-2 may be commonly provided to the multiplexers MUX1 to MUX4.

A multiplexer MUX1 outputs one of the compensation signal CD or a pixel data signal PD1 to a data line DL1 in response to the selection signal SEL. A multiplexer MUX2 outputs one of a pixel data signal PD2 or the compensation signal CD to a data line DL2 in response to the selection signal SEL. A multiplexer MUX3 outputs one of the compensation signal CD or a pixel data signal PD3 to a data line DL3 in response to the selection signal SEL. A multiplexer MUX4 outputs one of a pixel data signal PD4 or the compensation signal CD to a data line DL4 in response to the selection signal SEL.

The display layer 100-3 may further include a compensation circuit CC. The compensation circuit CC includes a resistor RL and a capacitor CL. The resistor RL may be connected between the sensor driving part 200C and a first node N1. The capacitor CL may be connected between the first node N1 and a ground terminal.

The electrode 210 and the cross electrode 220 of the sensor layer 200 illustrated in FIG. 6 and FIG. 7A include wiring resistance and capacitance components. When the sensor signal TX is generated based on the transmission signals S1a and S1b output from the sensor driving part 200C, signal attenuation or distortion by the wiring resistance and capacitance components in the electrode 210 and the cross electrode 220 may not be reflected on the sensor signal TX.

The resistor RL and the capacitor CL of the compensation circuit CC may compensate for the wiring resistance and capacitance components in the electrode 210 and the cross electrode 220 of the sensor layer 200. Therefore, the compensation circuit CC may output a compensation sensor signal TXC obtained by compensating for the wiring resistance and capacitance components in the electrode 210 and the cross electrode 220 of the sensor layer 200 in the sensor signal TX.

In FIG. 15, the compensation circuit CC is provided in the display layer 100-3, but the present disclosure is not limited thereto, and the compensation circuit CC may be provided in the sensor control circuit 200C1 (e.g., refer to FIG. 6) inside the sensor driving part 200C. In an embodiment, the compensation circuit CC may be provided in the data driving circuit 100C3-2.

Also, in the embodiment of FIG. 12, the compensation circuit CC may be further included to also be electrically connected between the sensor driving part 200C and the data driving circuit 1003C-1.

Figure 16:
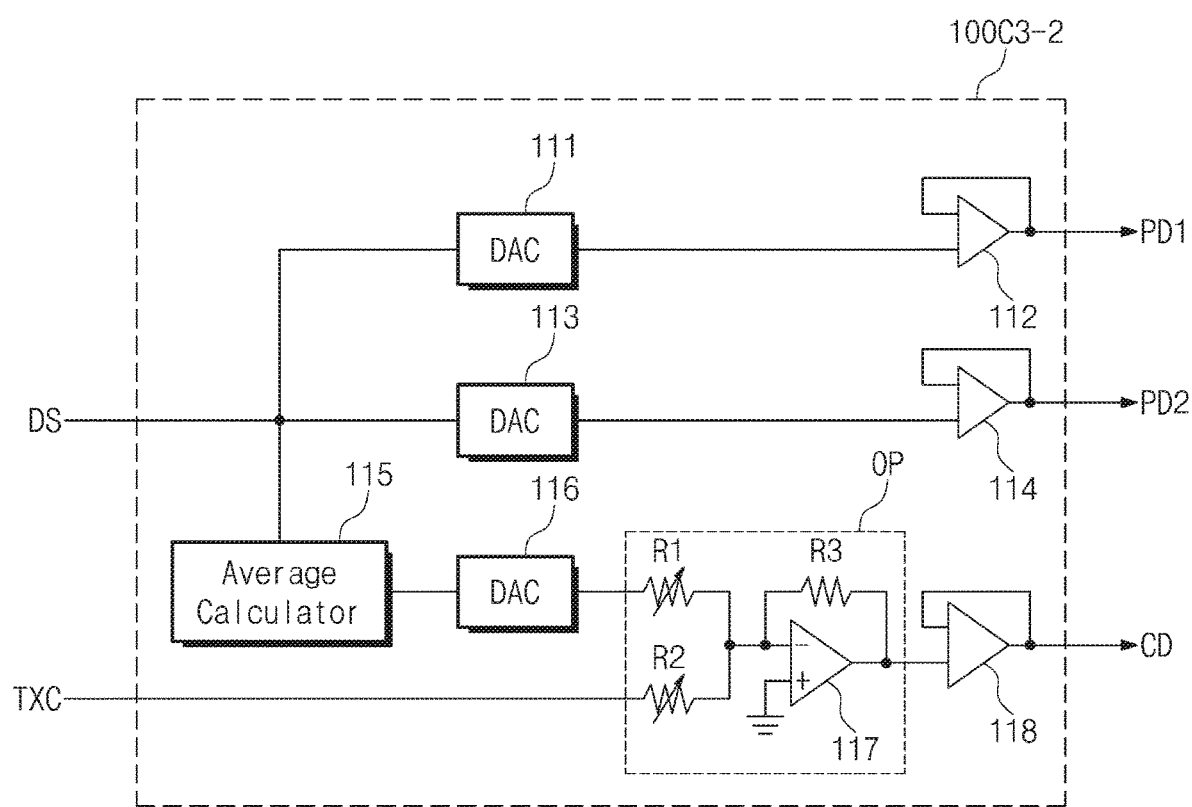
FIG. 16 is a circuit diagram showing a data driving circuit illustrated in FIG. 15.

FIG. 16 is a circuit diagram showing the data driving circuit 100C3-2 illustrated in FIG. 15.

FIG. 16 illustrates only a part of the data driving circuit 100C3-2 relating to the output of the compensation signal CD. However, the data driving circuit 100C3-2 is not limited to the circuit illustrated in FIG. 16, and may further include circuit components for performing various other suitable functions.

Referring to FIG. 15 and FIG. 16, the data driving circuit 100C3-2 includes digital-to-analog converters 111, 113, and 116, buffers 112, 114, and 118, an average calculator 115, an operational amplifier 117, and resistors R1, R2, and R3.

Each of digital-to-analog converters 111 and 113 corresponds to one of the data lines DL1 and DL2. Each of the digital-to-analog converters 111 and 113 converts a corresponding image data signal from among the image data signals DS provided from the signal control circuit 100C1 (e.g., refer to FIG. 5) to an analog signal. A buffer 112 outputs the analog signal output from the digital-to-analog converter 111 as the pixel data signal PD1. A buffer 114 outputs the analog signal output from the digital-to-analog converter 113 as the pixel data signal PD2.

FIG. 16 illustrates only two digital-to-analog converters 111 and 113 and two buffers 112 and 114 respectively corresponding to two data lines DL1 and DL2, but the number of digital-to-analog converters and buffers may be determined according to the number of the data lines DL1 to DL4 of the display layer 100-3.

The average calculator 115 calculates the average of the image data signals DS. The average calculator 115 may calculate the average of the image data signals DS of one frame, or may calculate the average of the image data signals DS per block. A block used to calculate the average includes the image data signal DS corresponding to a plurality of pixels, and a size of the block may be variously modified.

A digital-to-analog converter 116 converts a digital signal output from the average calculator 115 to an analog signal.

The resistors R1, R2, and R3 and the operational amplifier 117 may constitute (e.g., may form or may be included in) an inverting amplifier OP. The inverting amplifier OP may output a complimentary signal of the sum of the analog signal output from the digital-to-analog converter 116 and the compensation sensor signal TXC output from the sensor driving part 200C. Resistors R1 and R2 may be variable resistors.

A buffer 118 may output a signal output from the inverting amplifier OP as the compensation signal CD.

Figure 17:
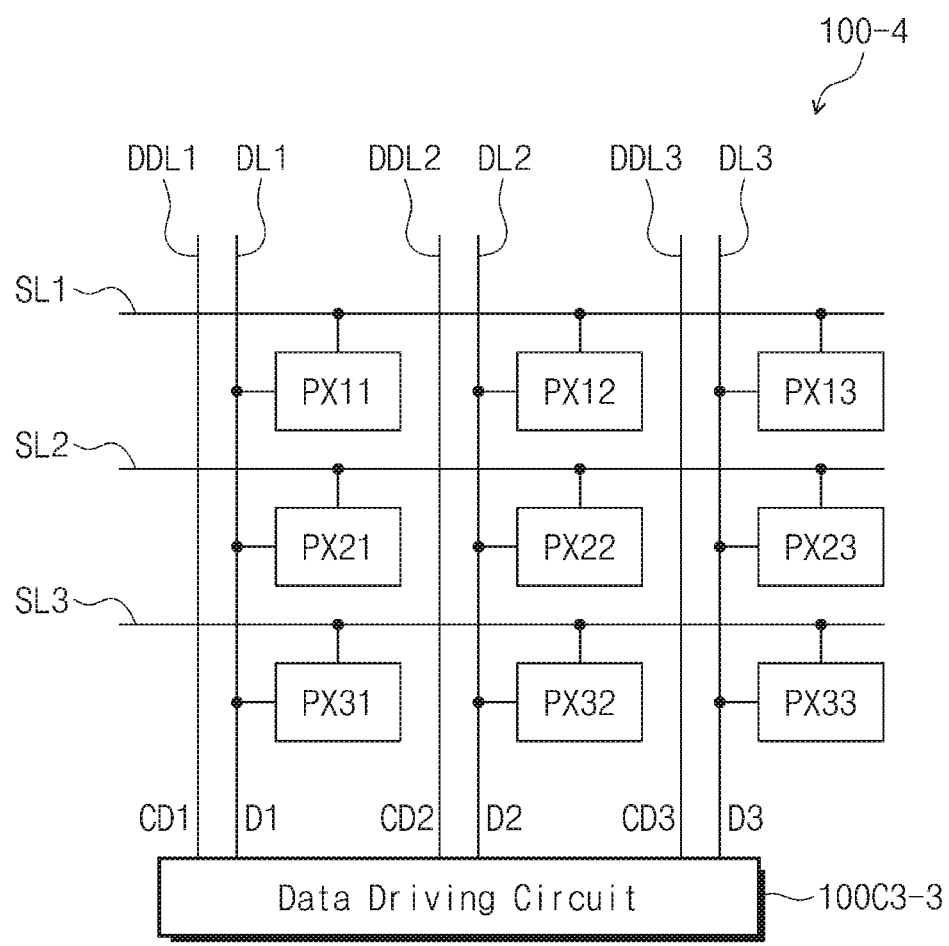
FIG. 17 is a view showing scan lines, data lines, and pixels of a display layer.

FIG. 17 is a view showing scan lines, data lines, and pixels of a display layer according to an embodiment of the present disclosure.

Referring to FIG. 17, a display layer 100-4 includes pixels PX11 to PX13, PX21 to PX23, and PX31 to PX33, scan lines SL1 to SL3, data lines DL1 to DL3, and dummy data lines DDL1 to DDL3. Each of the pixels PX11 to PX13, PX21 to PX23, and PX31 to PX33 may be electrically connected to one corresponding scan line from among the scan lines SL1 to SL3, and to one corresponding data line from among the data lines DL1 to DL3. Each of the dummy data lines DDL1 to DDL3 may be disposed to be adjacent to a corresponding data line from among the data lines DL1 to DL3. The dummy data lines DDL1 to DDL3 may not be electrically connected to the pixels PX11 to PX13, PX21 to PX23, and PX31 to PX33, and the dummy data lines DDL1 to DDL3 may not be electrically connected to the data lines DL1 to DL3.

A data driving circuit 1003C-3 outputs data signals D1 to D3 to the data lines DL1 to DL3, respectively, and outputs compensation signals CD1 to CD3 to the dummy data lines DDL1 to DDL3, respectively. Each of the compensation signals CD1 to CD3 may be a signal that is complementary to a corresponding data signal transmitted through an adjacent data line. For example, in an embodiment, a compensation signal CD1 provided to a dummy data line DDL1 may be a signal that is complementary to a data signal D1 provided to a data line DL1 that is adjacent to the dummy data line DDL1.

In an embodiment, each of the compensation signals CD1 to CD3 may be a signal that is complimentary to the average of the data signals transmitted through two or more adjacent data lines. For example, in an embodiment, a compensation signal CD2 of a dummy data line DDL2 may be a signal that is complementary to the average of the data signals D1 and D2 transmitted to the data lines DL1 and DL2.

Figure 18:
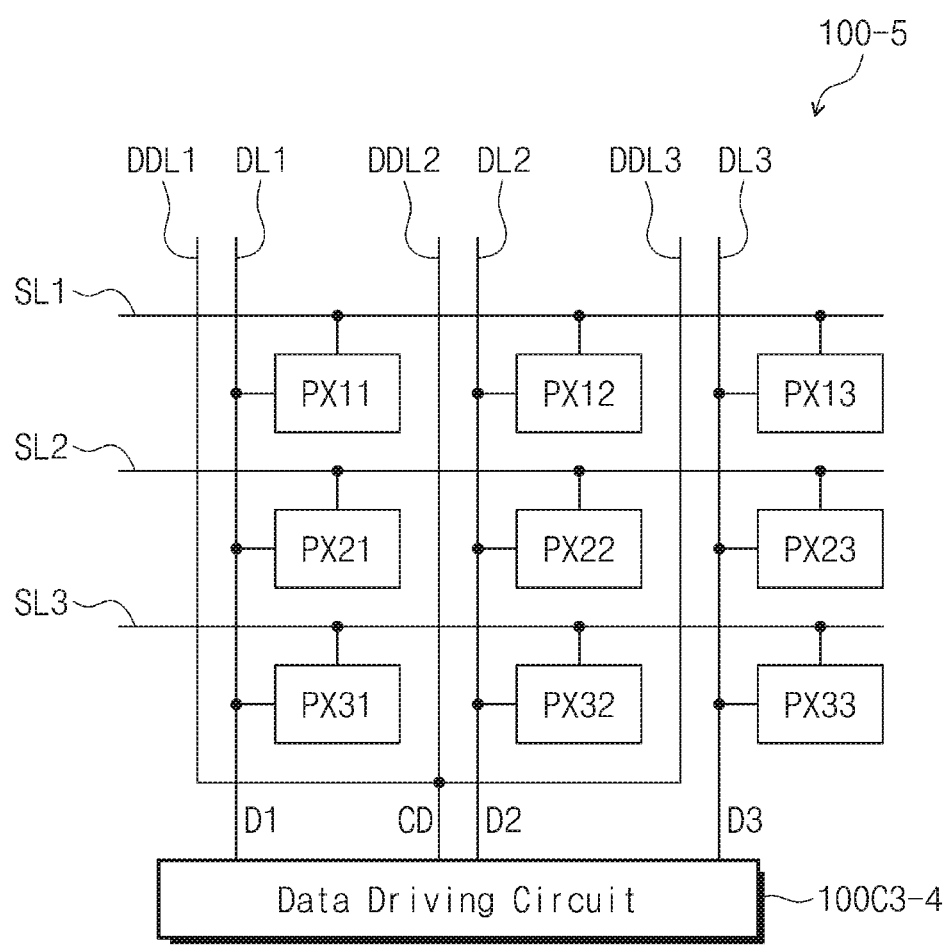
FIG. 18 is a view showing scan lines, data lines, and pixels of a display layer.

FIG. 18 is a view showing scan lines, data lines, and pixels of a display layer according to an embodiment of the present disclosure.

Referring to FIG. 18, the display layer 100-5 includes the pixels PX11 to PX13, PX21 to PX23, and PX31 to PX33, the scan lines SL1 to SL3, the data lines DL1 to DL3, and the dummy data lines DDL1 to DDL3. Each of the pixels PX11 to PX13, PX21 to PX23, and PX31 to PX33 may be electrically connected to one corresponding scan line from among the scan lines SL1 to SL3, and to one corresponding data line from among the data lines DL1 to DL3. Each of the dummy data lines DDL1 to DDL3 may be disposed to be adjacent to a corresponding data line from among the data lines DL1 to DL3. The dummy data lines DDL1 to DDL3 are not electrically connected to the pixels PX11 to PX13, PX21 to PX23, and PX31 to PX33.

The data driving circuit 1003C-4 outputs the data signals D1 to D3 to the data lines DL1 to DL3, respectively, and outputs the compensation signal CD to the dummy data lines DDL1 to DDL3. The compensation signal CD may be a signal that is complementary to the average of the data signals D1 to D3 transmitted to the data lines DL1 to DL3.

Figure 19:
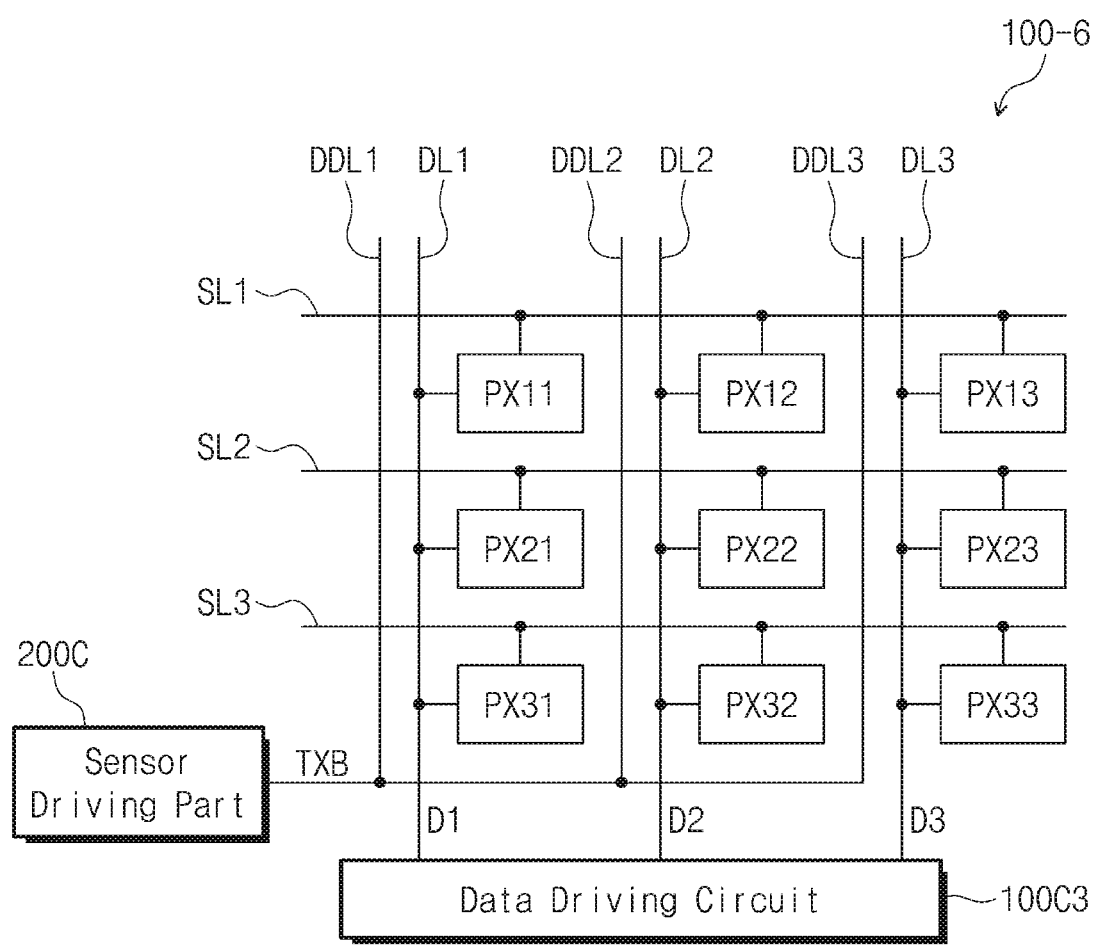
FIG. 19 is a view showing scan lines, data lines, and pixels of a display layer.

FIG. 19 is a view showing scan lines, data lines, and pixels of a display layer according to an embodiment of the present disclosure.

Referring to FIG. 19, a display layer 100-6 includes pixels PX11 to PX13, PX21 to PX23, and PX31 to PX33, scan lines SL1 to SL3, data lines DL1 to DL3, and dummy data lines DDL1 to DDL3. Each of the pixels PX11 to PX13, PX21 to PX23, and PX31 to PX33 may be electrically connected to one corresponding scan line from among the scan lines SL1 to SL3, and to one corresponding data line from among the data lines DL1 to DL3. Each of the dummy data lines DDL1 to DDL3 may be disposed to be adjacent to a corresponding data line from among the data lines DL1 to DL3. The dummy data lines DDL1 to DDL3 are not electrically connected to the pixels PX11 to PX13, PX21 to PX23, and PX31 to PX33.

The data driving circuit 100C3 outputs the data signals D1 to D3 to the data lines DL1 to DL3, respectively.

The sensor driving part 200C may generate a complimentary sensor signal TXB based on transmission signals provided to the sensor layer 200 (e.g., refer to FIG. 6). In an embodiment, the sensor driving part 200C may generate the complimentary sensor signal TXB based on a signal that is complementary to the sum of the transmission signals S1a and S1b (e.g., refer to FIG. 7A).

The complimentary sensor signal TXB may be commonly provided to the dummy data lines DDL1 to DDL3.

Figure 20:
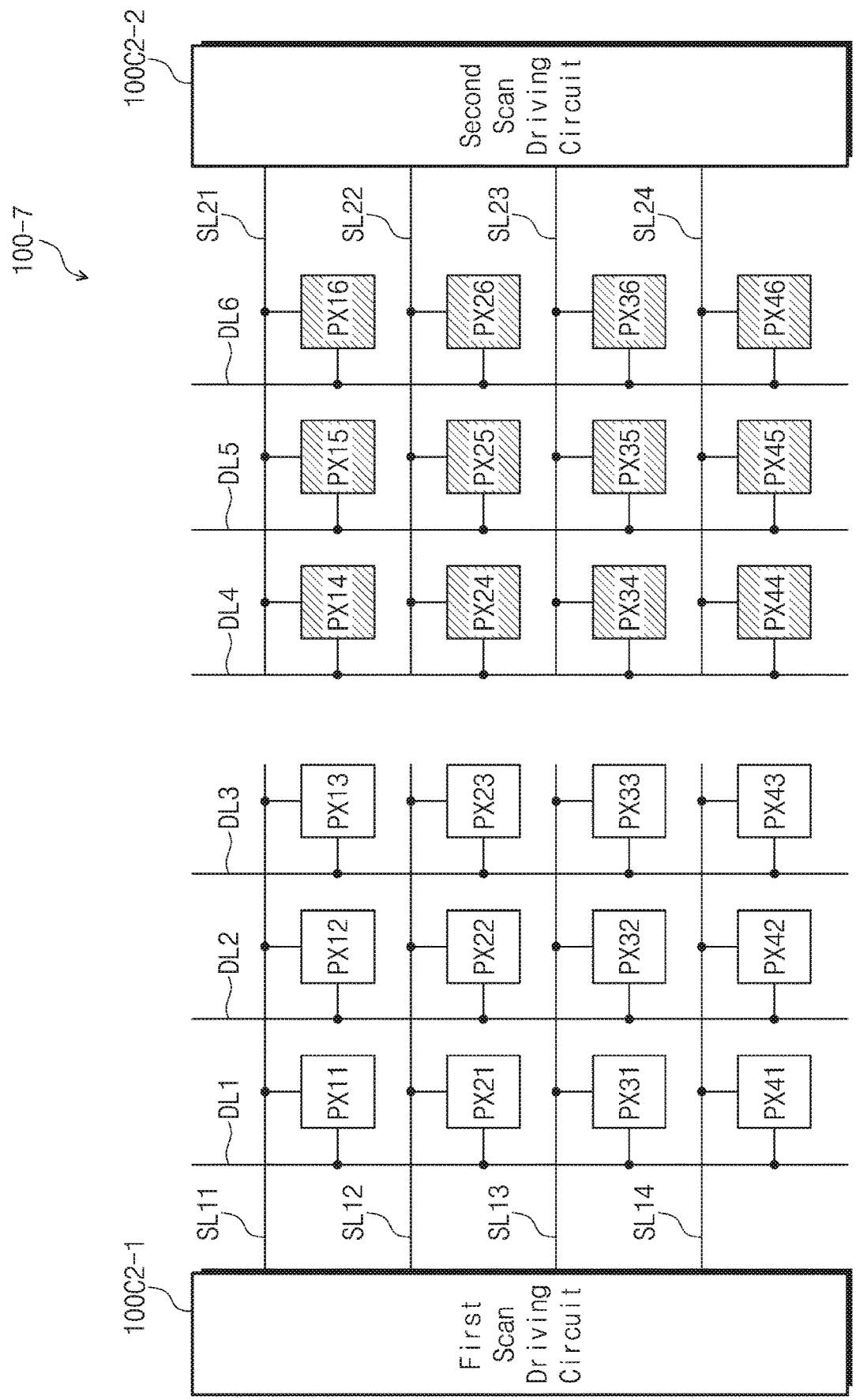
FIG. 20 is a view showing a display layer according to another embodiment of the present disclosure.

FIG. 20 is a view showing a display layer according to another embodiment of the present disclosure.

Referring to FIG. 20, a display layer 100-7 includes pixels PX11 to PX16, PX21 to PX26, PX31 to PX36, and PX41 to PX46, scan lines SL11 to SL14 and SL21 to SL24, data lines DL1 to DL6, a first scan driving circuit 100C2-1, and a second scan driving circuit 100C2-2. Each of the pixels PX11 to PX16, PX21 to PX26, PX31 to PX36, and PX41 to PX46 may be electrically connected to one corresponding scan line from among the scan lines SL11 to SL14 and SL21 to SL24, and to one corresponding data line from among the data lines DL1 to DL6.

The first scan driving circuit 100C2-1 and the second scan driving circuit 100C2-2 may be disposed to be spaced apart from each other in the first direction DR1 with the pixels PX11 to PX16, PX21 to PX26, PX31 to PX36, and PX41 to PX46 interposed therebetween.

The first scan driving circuit 100C2-1 may be electrically connected to first scan lines SL11 to SL14 from among the scan lines SL11 to SL14 and SL21 to SL24, and the second scan driving circuit 100C2-2 may be electrically connected to second scan lines SL21 to SL24 from among the scan lines SL11 to SL14 and SL21 to SL24.

Each of a first group of pixels PX11 to PX13, PX21 to PX23, PX31 to PX33, and PX41 to PX43 from among the pixels PX11 to PX16, PX21 to PX26, PX31 to PX36, and PX41 to PX46 may be electrically connected to one corresponding first scan line from among the first scan lines SL11 to SL14.

Each of a second group of pixels PX14 to PX16, PX24 to PX26, PX34 to PX36, and PX44 to PX46 from among the pixels PX11 to PX16, PX21 to PX26, PX31 to PX36, and PX41 to PX46 may be electrically connected to one corresponding second scan line from among the second scan lines SL21 to SL24.

Figure 21:
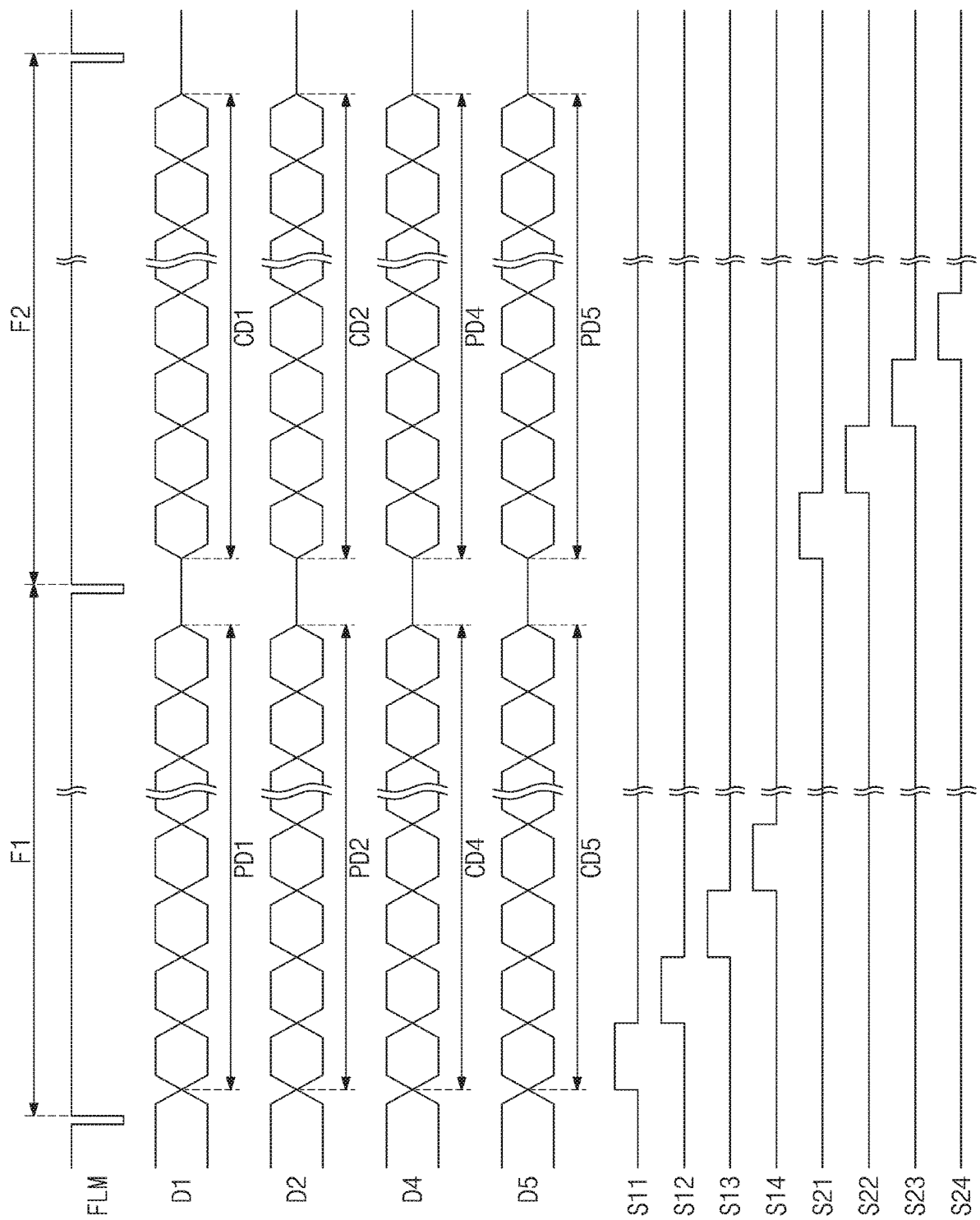
FIG. 21 is a timing diagram showing scan signals provided to the scan lines and data signals provided to the data lines of the display layer illustrated in FIG. 20.

FIG. 21 is a timing diagram showing scan signals provided to the scan lines and data signals provided to the data lines of the display layer illustrated in FIG. 20.

FIG. 21 illustrates only the data signals D1, D2, D4, and D5 provided to the data lines DL1, DL2, DL4, and DL5 from among the data lines DL1 to DL6 illustrated in FIG. 20. The data lines DL3 and DL6 illustrated in FIG. 20 may be driven in the same or substantially the same manner as those of the data lines DL1, DL2, DL4, and DL5, and thus, redundant description thereof may not be repeated.

Referring to FIG. 20 and FIG. 21, a start signal FLM may be a signal provided from the signal control circuit 100C1 to the scan driving circuits 100C2-1 and 100C2-2. The start signal FLM may be a signal indicating the start of one frame.

The scan driving circuit 100C2-1 may sequentially output the first scan signals S11 to S14 to have an active level (for example, a high level) in synchronization with the start signal FLM. The first scan signals S11 to S14 may be provided to the first scan lines SL11 to SL14.

The scan driving circuit 100C2-2 may sequentially output the second scan signals S21 to S24 to have an active level (for example, a high level) in synchronization with the start signal FLM. The second scan signals S21 to S24 may be provided to the second scan lines SL21 to SL24.

A data signal D1 provided to a data line DL1 by the data driving circuit 100C3 (e.g., see FIG. 5) during the first frame F1 is a pixel data signal PD1 corresponding to the image data signal DS provided from the signal control circuit 100C1. A data signal D2 provided to a data line DL2 during the first frame F1 is a pixel data signal PD2 corresponding to the image data signal DS provided from the signal control circuit 100C1.

A data signal D4 provided to a data line DL4 during the first frame F1 is the compensation signal CD4 provided from the signal control circuit 100C1. A data signal D5 provided to a data line DL5 during the first frame F1 is the compensation signal CD5 provided from the signal control circuit 100C1.

The data signal D1 provided to the data line DL1 during the second frame F2 is the compensation signal CD1 from the signal control circuit 100C1. The data signal D2 provided to the data line DL2 during the second frame F2 is the compensation signal CD2.

The data signal D4 provided to the data line DL4 during the second frame F2 is a pixel data signal PD4 corresponding to the image data signal DS provided from the signal control circuit 100C1. The data signal D5 provided to the data line DL5 during the second frame F2 is a pixel data signal PD5 corresponding to the image data signal DS provided from the signal control circuit 100C1.

Therefore, the first group of pixels PX11 to PX13, PX21 to PX23, PX31 to PX33, and PX41 to PX43 illustrated in FIG. 20 may receive pixel data signals as a data signal through the data lines DL1, DL2, and DL3 in the first frame F1, and may display an image corresponding to the data signal in response to the first scan signals S11 to SL14. The first group of pixels PX11 to PX13, PX21 to PX23, PX31 to PX33, and PX41 to PX43 may receive compensation signals through the data lines DL1, DL2, and DL3 in the second frame F2, but may not display an image corresponding to the compensation signals, because the first scan signals S11 to S14 may have an inactive level during the second frame F2.

The second group of pixels PX14 to PX16, PX24 to PX26, PX34 to PX36, and PX44 to PX46 illustrated in FIG. 20 may receive compensation signals as a data signal through the data lines DL4, DL5, and DL6 in the first frame F1, but may not display an image corresponding to the compensation signals, because the second scan signals S21 to S24 may have an inactive level during the first frame F1. The second group of pixels PX14 to PX16, PX24 to PX26, PX34 to PX36, and PX44 to PX46 may receive pixel data signals as a data signal through the data lines DL4, DL5, and DL6 in the second frame F2, and may display an image corresponding to the data signal in response to the second scan signals S21 to S24.

Figure 22:
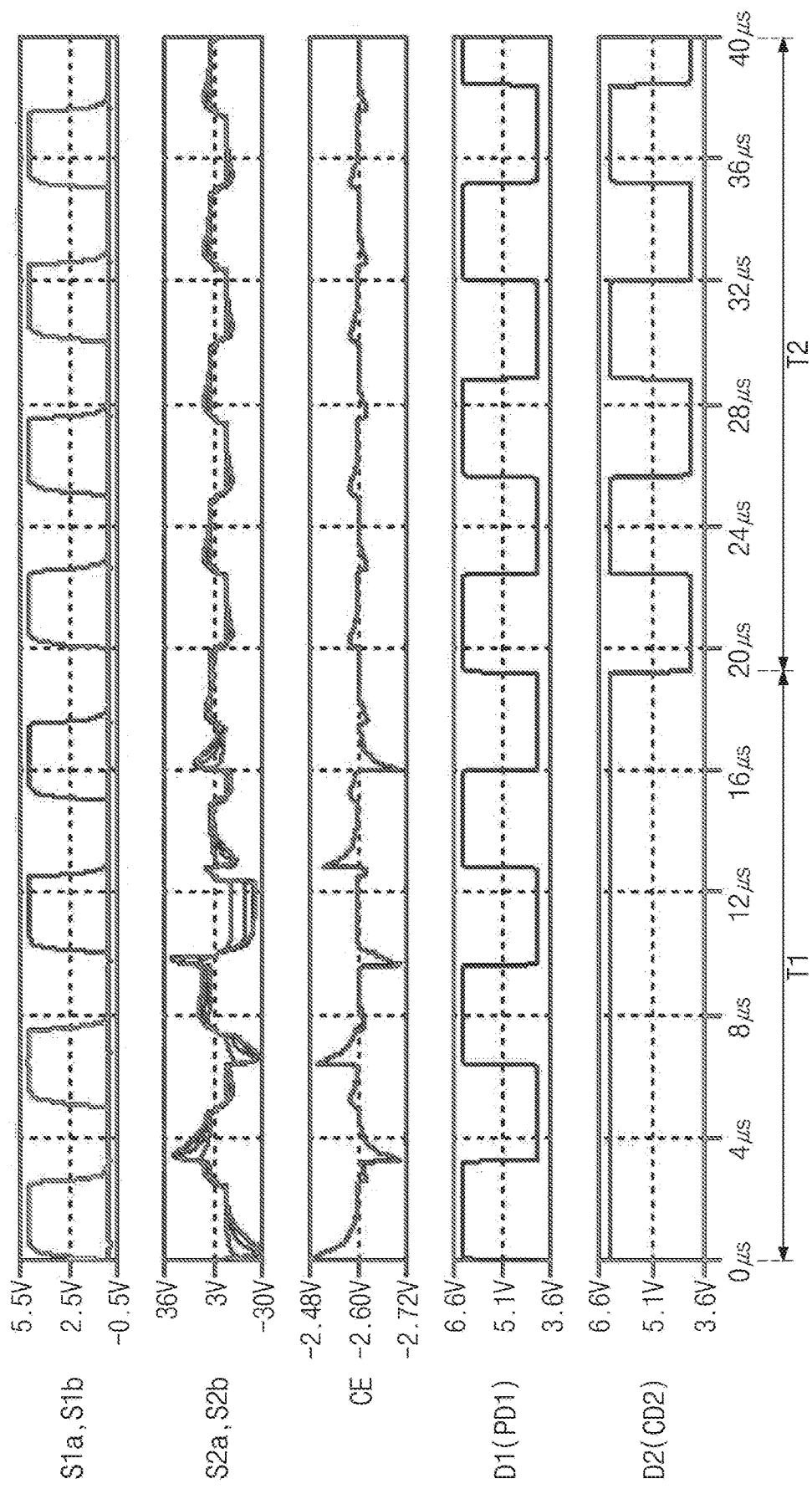
FIG. 22 is a graph showing changes in sensing sensitivity of a sensor layer by a compensation signal.

FIG. 22 is a graph showing changes in sensing sensitivity of a sensor layer by a compensation signal.

Referring to FIG. 8, FIG. 9, and FIG. 22, it is assumed that the data signal D1 provided to the data line DL1 in a first section T1 is the pixel data signal PD1 that is periodically changed to a voltage level corresponding to a white image and a voltage level corresponding to a black image, and the data signal D2 provided to the data line DL2 in the first section T1, or in other words, the compensation signal CD2, is maintained or substantially maintained at a suitable voltage level (e.g., a predetermined voltage level).

When the data signal D1 is changed to a voltage level corresponding to a white image and a voltage level corresponding to a black image, a variation of the parasitic capacitance Ca between the data line DL1 and the second electrode CE (e.g., refer to FIG. 4) may be large. In this case, even when the transmission signals S1a and S1b provided from the sensor driving part 200C illustrated in FIG. 7A to the electrode 210 and the cross electrode 220 have a stable voltage level, the sensing signals S2a and S2b induced from the input device 2000 may be in an unstable state. In this case, the sensing sensitivity of the sensor layer 200 and the sensor driving part 200C may be inaccurate.

The data signal D2 provided to the data line DL2 in a second section T2 may be the compensation signal CD2 having a voltage level that is complementary to the data signal D1. In this case, the coupling capacitance between the data line DL1 and the second electrode CE may be offset by the coupling capacitance between the data line D2 and the second electrode CE.

Therefore, the sensing signals S2a and S2b induced from the input device 2000 in the second section T2 may be in a stable state that is less affected by noise. Therefore, it may be possible to prevent or substantially prevent the sensing sensitivity of the sensor layer 200 from being deteriorated by a signal transmitted through the display layer 100.

Figure 23:
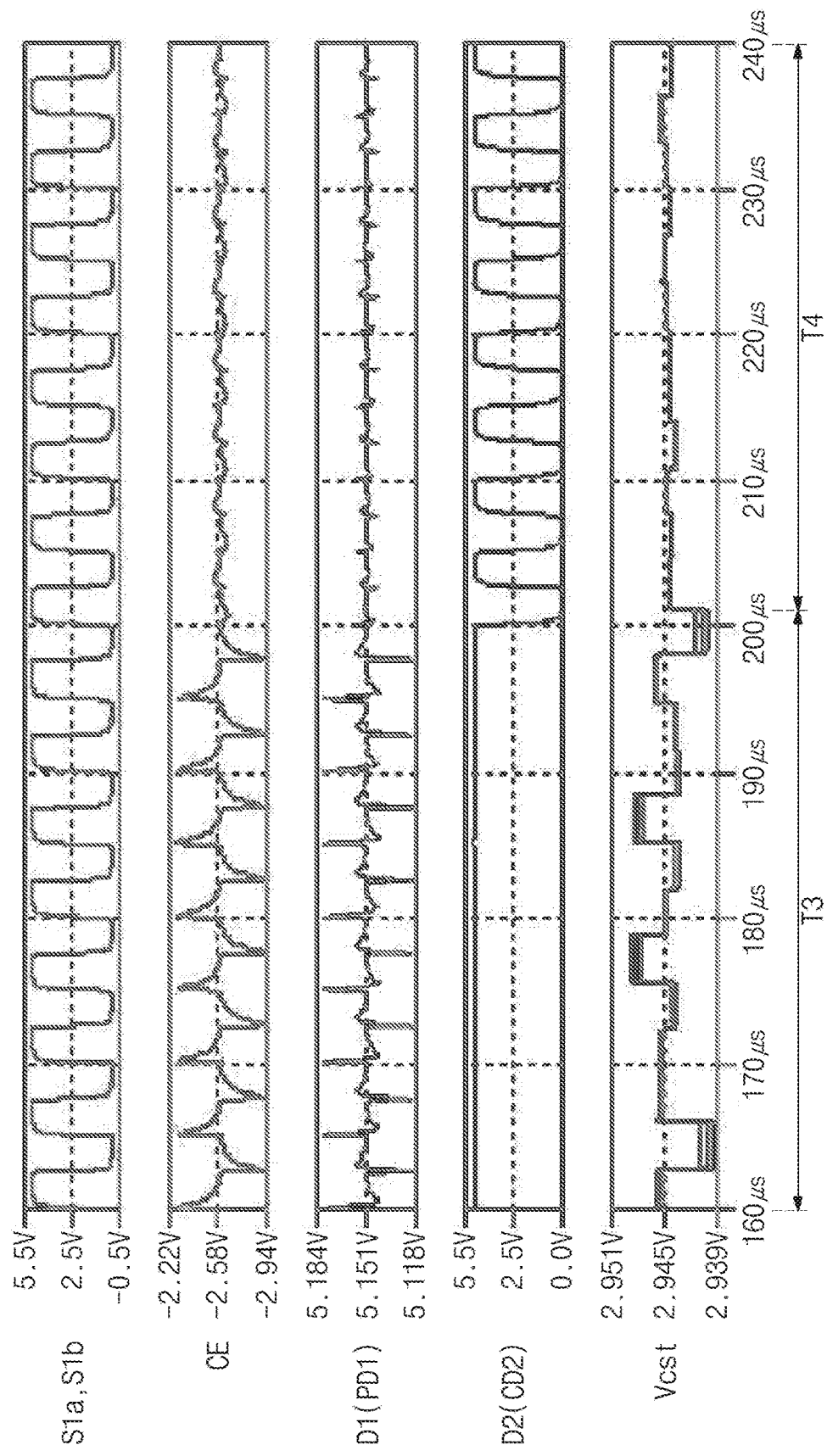
FIG. 23 is a graph showing changes in luminance of a display layer by a compensation signal.

FIG. 23 is a graph showing changes in luminance of a display layer by a compensation signal.

Referring to FIG. 8, FIG. 9, and FIG. 23, the data signal D1 corresponding to the pixel data signal PD1 of a gray scale level (e.g., a predetermined gray scale level) is provided to the data line DL1 in a third section T3, and the data signal D2 provided to the data line DL2 in the third section T3, or in other words, the compensation signal CD2, is assumed to be maintained or substantially maintained at a suitable voltage level (e.g., a predetermined voltage level).

The transmission signals S1a and S1b provided from the sensor driving part 200C to the electrode 210 and the cross electrode 220 may be a signal that is periodically changed to a high level (for example, 5 V) and a low level (for example, 0 V).

When the transmission signals S1a and S1b are periodically changed to a high level and a low level, a variation of the parasitic capacitance Cb between the second conductive layer 204 and the second electrode CE may be large. In this case, even when the data signal D1 provided from the data driving circuit 100C3 (e.g., refer to FIG. 5) to the data line DL1 has a stable voltage level, the voltage level of the actual data signal D1 may be in an unstable state. In this case, the luminance Vcst of an image displayed on the display layer 100 may also be in an unstable state. The luminance Vcst illustrated in FIG. 22 is obtained by changing the luminance of the image displayed on the display layer to a voltage level.

The data signal D2 provided to the data line DL2 in a fourth section T4 may be the compensation signal CD2 having a voltage level that is complementary to the transmission signals S1a and S1b. In this case, the coupling capacitance between the data line 204 and the second electrode CE may be offset by the coupling capacitance between the data line DL2 and the second electrode CE.

Therefore, the luminance Vcst of an image displayed on the display layer 100 in the fourth section T4 may be in a stable state. Thus, it may be possible to prevent or substantially prevent the display quality of the image displayed on the display layer 100 from being deteriorated by a signal transmitted through the sensor layer 200.

A display device according to one or more embodiments of the present disclosure may provide a signal that is complementary to a data signal of a display layer to a data line, and/or a signal that is complementary to a transmission signal of a sensor layer to the data line, and thus, may minimize or reduce signal distortion that may be caused by coupling capacitance between the display layer and the sensor layer. Therefore, it may be possible to prevent or substantially prevent the sensing sensitivity of an input by an input device, for example, such as an electronic pen, from being deteriorated, and to prevent or substantially prevent the display quality of an image displayed on a display layer from being deteriorated.

Although some example embodiments have been described, those skilled in the art will readily appreciate that various modifications are possible in the example embodiments without departing from the spirit and scope of the present disclosure. It will be understood that descriptions of features or aspects within each embodiment should typically be considered as available for other similar features or aspects in other embodiments, unless otherwise described. Thus, as would be apparent to one of ordinary skill in the art, features, characteristics, and/or elements described in connection with a particular embodiment may be used singly or in combination with features, characteristics, and/or elements described in connection with other embodiments unless otherwise specifically indicated. Therefore, it is to be understood that the foregoing is illustrative of various example embodiments and is not to be construed as limited to the specific example embodiments disclosed herein, and that various modifications to the disclosed example embodiments, as well as other example embodiments, are intended to be included within the spirit and scope of the present disclosure as defined in the appended claims, and their equivalents.

What is claimed is:

1. A display device comprising:
a display layer;
a sensor layer on the display layer;
a sensor driving part configured to provide a transmission signal to the sensor layer; and
a display driving part configured to drive the display layer, wherein the display layer comprises:
   a plurality of pixels;
   first scan lines electrically connected to a first group of pixels from among the plurality of pixels;
   second scan lines electrically connected to a second group of pixels from among the plurality of pixels; and
   data lines electrically connected to the plurality of pixels,
wherein the display driving part is configured to drive the first scan lines, the second scan lines, and the data lines, and to alternately provide a pixel data signal and a compensation signal to data lines corresponding to the first group of pixels from among the data lines and data lines corresponding to the second group of pixels from among the data lines, and
wherein the compensation signal is a signal that is complementary to at least one of the pixel data signal or the transmission signal,
wherein the display driving part is configured to sequentially drive the second scan lines to have an active level during a first frame, and to sequentially drive the first scan lines to have the active level during a second frame after the first frame.

2. The display device of claim 1, wherein:
the plurality of pixels are located along a first direction, and a second direction crossing the first direction;
each of the first and second scan lines extends in the first direction; and
the data lines extend in the second direction.

3. The display device of claim 2, wherein pixels of the first group of pixels and pixels of the second group of pixels are alternately located along the first direction.

4. The display device of claim 1, wherein:
the compensation signal provided to a data line corresponding to a pixel from among the first group of pixels has a voltage level that is complementary to the pixel data signal provided to a data line corresponding to a pixel from among the second group of pixels; and
the compensation signal provided to a data line corresponding to a pixel from among the second group of pixels has a voltage level that is complementary to the pixel data signal provided to a data line corresponding to a pixel from among the first group of pixels.

5. The display device of claim 1, wherein:
during the first frame, the display driving part is configured to provide the pixel data signal to the data lines corresponding to the first group of pixels, and to provide the compensation signal to the data lines corresponding to the second group of pixels; and
during the second frame, the display driving part is configured to provide the pixel data signal to the data lines corresponding to the second group of pixels, and to provide the compensation signal to the data lines corresponding to the first group of pixels.

6. The display device of claim 1, wherein:
the display layer comprises a plurality of multiplexers corresponding to the data lines, respectively; and
each of the multiplexers is configured to provide any one of the pixel data signal or a signal that is complementary to the transmission signal to a corresponding data line in response to a selection signal.

7. The display device of claim 1, wherein the display driving part comprises:
a scan driving circuit configured to drive the first scan lines and the second scan lines; and
a data driving circuit configured to drive the data lines.

8. The display device of claim 7, wherein the data driving circuit is configured to receive the transmission signal, and to output a selection signal, the pixel data signal, and the compensation signal,
wherein the compensation signal is a signal that is complementary to a sum of the pixel data signal and the transmission signal,
wherein the display layer comprises a plurality of multiplexers corresponding to the data lines, respectively, and
wherein each of the multiplexers is configured to provide any one of the pixel data signal or the compensation signal to a corresponding data line in response to the selection signal.

9. The display device of claim 7, wherein the data driving circuit is configured to receive the transmission signal, and to output a selection signal, the pixel data signal, and the compensation signal,
wherein the compensation signal is a signal that is complementary to a sum of an average of pixel data signals in one frame and the transmission signal,
wherein the display layer comprises multiplexers corresponding to the data lines, respectively, and
wherein each of the multiplexers is configured to provide any one of the pixel data signal or the compensation signal to a corresponding data line in response to the selection signal.

10. The display device of claim 1, wherein the sensor driving part is configured to operate in a first mode for sensing an input by an input device that outputs a down-link signal, or in a second mode for sensing an input by a touch.

11. The display device of claim 10, wherein:
in the first mode, the sensor driving part is configured to output an up-link signal to the sensor layer, and to receive the down-link signal through the sensor layer; and
the sensor driving part is configured to generate the transmission signal according to the up-link signal.

12. The display device of claim 1, wherein the display driving part comprises:
a first scan driving circuit configured to drive the first scan lines;
a second scan driving circuit configured to drive the second scan lines; and
a data driving circuit configured to drive the data lines.

13. The display device of claim 12, wherein:
the first scan driving circuit is configured to sequentially drive the first scan lines during the first frame; and
the second scan driving circuit is configured to sequentially drive the second scan lines during the second frame.

14. The display device of claim 13, wherein:
during the first frame, the data driving circuit is configured to provide the pixel data signal to the data lines corresponding to the first group of pixels, and to provide the compensation signal to the data lines corresponding to the second group of pixels; and
during the second frame, the data driving circuit is configured to provide the pixel data signal to the data lines corresponding to the second group of pixels, and to provide the compensation signal to the data lines corresponding to the first group of pixels.

15. A display device comprising:
a display layer;
a sensor layer on the display layer;
a sensor driving part configured to provide a transmission signal to the sensor layer; and
a display driving part configured to drive the display layer,
wherein the display layer comprises:
a plurality of pixels;
scan lines electrically connected to the pixels;
data lines electrically connected to the pixels; and
dummy data lines,
wherein each of the dummy data lines is located adjacent to a corresponding data line from among the data lines,
wherein the display driving part is configured to output a data signal corresponding to a pixel data signal to the data lines, and to output a compensation signal to the dummy data lines, and
wherein the compensation signal is a signal that is complementary to at least one of the pixel data signal or the transmission signal.

16. The display device of claim 15, wherein the dummy data lines are insulated from the data lines and the pixels.

17. The display device of claim 15, wherein:
a first dummy data line from among the dummy data lines corresponds to a first data line from among the data lines; and
the compensation signal provided to the first dummy data line is complementary to a data signal provided to the first data line.

18. The display device of claim 15, wherein the compensation signal is a signal that is complementary to an average of data signals provided to the data lines.

19. The display device of claim 15, wherein:
the sensor driving part is configured to output an up-link signal to the sensor layer, and to receive a down-link signal from an input device through the sensor layer; and
the sensor driving part is configured to generate the transmission signal according to the up-link signal.

* * * * *